(12) United States Patent
Lacey

(10) Patent No.: US 12,380,646 B2
(45) Date of Patent: *Aug. 5, 2025

(54) ACCESSING PRIMITIVE DATA USING TESSELLATED PRIMITIVE ID

(71) Applicant: Imagination Technologies Limited, Kings Langley (GB)

(72) Inventor: Peter Malcolm Lacey, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/736,313

(22) Filed: Jun. 6, 2024

(65) Prior Publication Data

US 2024/0331298 A1 Oct. 3, 2024

Related U.S. Application Data

(63) Continuation of application No. 16/376,511, filed on Apr. 5, 2019, now Pat. No. 12,039,667.

(30) Foreign Application Priority Data

Apr. 5, 2018 (GB) ...................... 1805678

(51) Int. Cl.
*G06T 17/20* (2006.01)
*G06T 15/00* (2011.01)
*G06T 17/00* (2006.01)
*G06T 17/10* (2006.01)

(52) U.S. Cl.
CPC ............ *G06T 17/20* (2013.01); *G06T 15/005* (2013.01); *G06T 17/005* (2013.01); *G06T 17/10* (2013.01); *G06T 2200/28* (2013.01)

(58) Field of Classification Search
CPC ..... G06T 17/20; G06T 15/005; G06T 17/005; G06T 17/10; G06T 2200/28; G06T 19/20; G06T 1/20
See application file for complete search history.

(56) References Cited

U.S. PATENT DOCUMENTS

| 11,308,691 B2 | 4/2022 | Lacey |
| 11,676,336 B2 | 6/2023 | Lacey |
| 12,039,667 B2 * | 7/2024 | Lacey ..................... G06T 17/20 |
| 2012/0229464 A1 | 9/2012 | Fishwick |
| 2013/0257891 A1 | 10/2013 | Sathe et al. |
| 2014/0267256 A1 | 9/2014 | Heggelund et al. |

(Continued)

OTHER PUBLICATIONS

Evans et al., "Right-Triangulated Irregular Networks," Algorithmica, vol. 30, No. 2, Jun. 1, 2001; pp. 264-286.

(Continued)

*Primary Examiner* — Chong Wu
(74) *Attorney, Agent, or Firm* — Potomac Law Group, PLLC; Vincent M DeLuca

(57) ABSTRACT

A method of generating identifiers (IDs) for primitives and optionally vertices during tessellation. The IDs include a binary sequence of bits that represents the sub-division steps taken during the tessellation process and so encodes the way in which tessellation has been performed. Such an ID may subsequently be used to generate a random primitive or vertex and hence recalculate vertex data for that primitive or vertex.

20 Claims, 15 Drawing Sheets

(56) References Cited

U.S. PATENT DOCUMENTS

| | | |
|---|---|---|
| 2015/0002508 A1 | 1/2015 | Tatarinov et al. |
| 2015/0317818 A1 | 11/2015 | Howson et al. |
| 2016/0353376 A1 | 12/2016 | Yi et al. |
| 2016/0358375 A1 | 12/2016 | Lacey et al. |
| 2016/0358376 A1 | 12/2016 | Lacey et al. |
| 2017/0069132 A1 | 3/2017 | Howson et al. |
| 2017/0098326 A1 | 4/2017 | Wampler |

OTHER PUBLICATIONS

Grabner, "Compressed Adaptive Multiresolution Encoding (CAME)," Journal of WSCG, vol. 10, No. 1-2, 8 pages, 2002.

Grabner; "Compressed Adaptive Multiresolution Encoding"; Journal of WSCG; vol. 10; No. 1-2; Jan. 1, 2002; pp. 1-8.

Tatarchuk et al., "Real-Time Tessellation on GPU," SIGGRAPH Advanced Real-Time Rendering in 3D Graphics and Game Course, vol. 37, 53 pages (2007).

Tatarchuk et al; "Real-Time Tessellation on GPU";Siggraph Advanced Real-Time Rendering in 3D Graphics and Games Course; vol. 37; Jan. 1, 2007; pp. 1-53.

*(note: copies of NPL documents in parent application(s)).

* cited by examiner

FIG. 9A
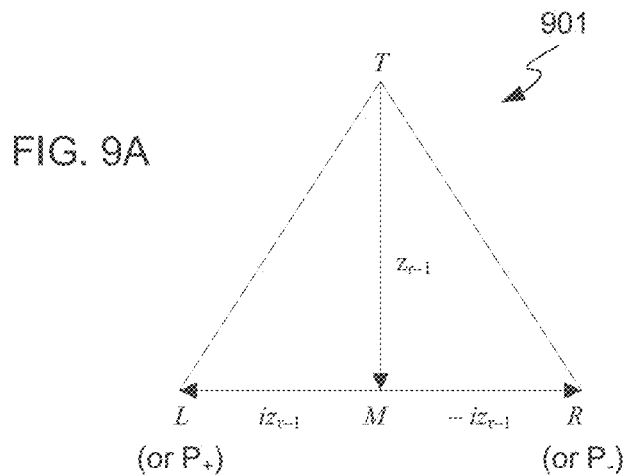
FIG. 9B
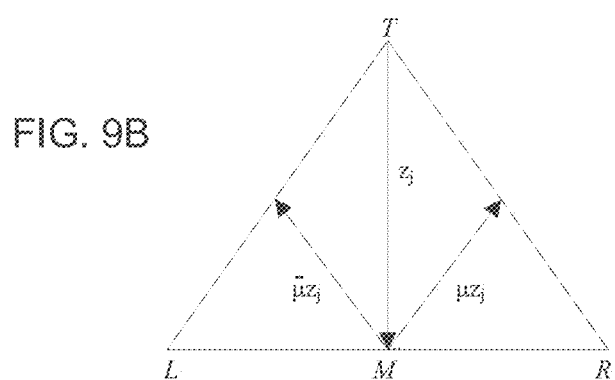
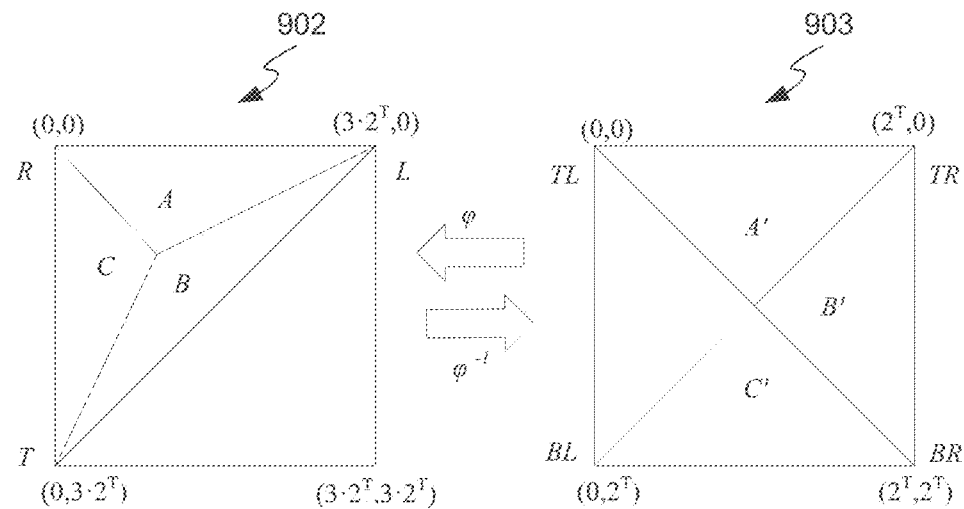
FIG. 9C

| $r$ | $s$ | | $\gamma(s) = [P_\_, P_\_]$ | |
|---|---|---|---|---|
| 0 | $a_0 a_1 10 \ldots 0$ | | $\{R, L\}$ | $\{a_0 a_1 0 \ldots 0, a_0' a_1' 0 \ldots 0\}$ |
| 1 | $a_0 a_1 010 \ldots 0$ | | $\{T, R\}$ | $\{1000 \ldots 0, a_0 a_1 0 \ldots 0\}$ |
| 1 | $a_0 a_1 110 \ldots 0$ | | $\{L, T\}$ | $\{a_0' a_1' 0 \ldots 0, 1000 \ldots 0\}$ |
| >1 | $a_0 a_1 000 \ldots 010 \ldots 0$ | $r$ even<br>$r$ odd | $\{R, P_{r-1}\}$<br>$\{P_{r-1}, R\}$ | $\{a_0 a_1 0 \ldots 0, a_0 a_1 0 \ldots 010 \ldots 0\}$<br>$\{a_0 a_1 0 \ldots 010 \ldots 0, a_0 a_1 0 \ldots 0\}$ |
| >1 | $a_0 a_1 011 \ldots 110 \ldots 0$ | $r$ odd<br>$r$ even | $\{T, P_{r-1}\}$<br>$\{P_{r-1}, T\}$ | $\{1000 \ldots 0, a_0 a_1 0 \ldots 110 \ldots 0\}$<br>$\{a_0 a_1 0 \ldots 110 \ldots 0, 1000 \ldots 0\}$ |
| >1 | $a_0 a_1 100 \ldots 010 \ldots 0$ | $r$ even<br>$r$ odd | $\{T, P_{r-1}\}$<br>$\{P_{r-1}, T\}$ | $\{1000 \ldots 0, a_0 a_1 1 \ldots 010 \ldots 0\}$<br>$\{a_0 a_1 1 \ldots 010 \ldots 0, 1000 \ldots 0\}$ |
| >1 | $a_0 a_1 111 \ldots 110 \ldots 0$ | $r$ odd<br>$r$ even | $\{L, P_{r-1}\}$<br>$\{P_{r-1}, L\}$ | $\{a_0' a_1' 0 \ldots 0, a_0 a_1 1 \ldots 110 \ldots 0\}$<br>$\{a_0 a_1 1 \ldots 110 \ldots 0, a_0' a_1' 0 \ldots 0\}$ |
| >2 | $a_0 a_1 b_0 \ldots b_{p'-1} b_{p'} \overline{b_{p'+1}} \ldots \overline{b_{r-1}} 10 \ldots$<br>s.t. $\overline{b_{p'}} = b_{p'+1} = \cdots = b_{r-1}$,<br>$r - 1 > p' \geq 1$ | $b_{r-1} \not\equiv r$<br>$b_{r-1} \equiv r$ | $\{P_{p'}, P_{r-1}\}$<br>$\{P_{r-1}, P_{p'}\}$ | $\{a_0 a_1 b_0 \ldots b_{p'-1} 10 \ldots 0, a_0 a_1 b_0 \ldots b_{r-1} 10 \ldots\}$<br>$\{a_0 a_1 b_0 \ldots b_{r-1} 10 \ldots 0, a_0 a_1 b_0 \ldots b_{p'-1} 10 \ldots\}$ |

FIG. 15

ACCESSING PRIMITIVE DATA USING TESSELLATED PRIMITIVE ID

CROSS-REFERENCE TO RELATED APPLICATIONS AND CLAIM OF PRIORITY

This application is a continuation under 35 U.S.C. 120 of copending application Ser. No. 16/376,511 filed Apr. 5, 2019, which claims foreign priority under 35 U.S.C. 119 from United Kingdom Application No. 1805678.8 filed Apr. 5, 2018, the contents of which are incorporated by reference herein in their entirety. This application is also related to prior application Ser. No. 16/997,074 filed Aug. 19, 2020, now U.S. Pat. No. 11,308,691, and prior application Ser. No. 17/707,032 filed Mar. 29, 2022, now U.S. Pat. No. 11,676,336.

BACKGROUND

Tessellation is a technique used in computer graphics to divide up a set of surfaces representing objects in a scene into a number of smaller and simpler pieces, (referred to as primitives), typically triangles, which are more amenable to rendering. The resulting tessellated surface is generally an approximation to the original surface, but the accuracy of this approximation can be improved by increasing the number of generated primitives, which in turn usually results in the primitives being smaller. The amount of tessellation/sub-division is usually determined by a level of detail (LOD). An increased number of primitives is therefore typically used where a higher level of detail is required, e.g. because an object is closer to the viewer and/or the object has a more intricate shape. However, use of larger numbers of triangles increases the processing effort required to render the scene.

The sub-division into triangle primitives is typically performed on patches which are square or triangular in shape (i.e. a quad or a triangle) and which may be curved to fit to the surface of the object they represent (and hence may be referred to as 'surface patches') and/or have displacement mapping applied. The sub-division, however, is not performed on curved patches but is instead performed in the domain of the patch (e.g. as if the patch is planar rather than being defined by, for example, a polynomial equation) which may be defined in terms of (u,v) parameters (also referred to a UV parameters) and referred to as 'parametric space' or UV space. This means that the tessellation process is independent of any curvature present in the final surface.

As the number of primitives that are generated increases, the ability of a graphics processing system to process the primitives becomes more important. One known way of improving the efficiency of a graphics processing system is to render an image in a tile-based manner. In this way, the rendering space into which primitives are to be rendered is divided into a plurality of tiles, which can then be rendered independently from each other. A tile-based graphics system includes a tiling unit to tile the primitives, i.e. to determine, for a primitive, which of the tiles of a rendering space the primitive is in. Then, when a rendering unit renders the tile, it can be given information indicating which primitives should be used to render the tile.

The embodiments described below are provided by way of example only and are not limiting of implementations which solve any or all of the disadvantages of known graphics processing systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein is a method of generating identifiers (IDs) for primitives and optionally vertices during tessellation. The IDs include a binary sequence of bits that represents the sub-division steps taken during the tessellation process and so encodes the way in which tessellation has been performed. Such an ID may subsequently be used to generate a random primitive or vertex and hence recalculate vertex data for that primitive or vertex.

A first aspect provides a method of performing tessellation in a computer graphics system, the method comprising: sub-dividing an initial patch into a plurality of primitives using a plurality of sub-division steps; and generating a primitive ID for each primitive, wherein the primitive ID encodes data about how the primitive was generated by the plurality of sub-division steps.

A second aspect provides a method of performing tessellation in a computer graphics system, the method comprising: receiving, in a tessellation unit, an ID of a previously tessellated primitive and a surface patch reference; accessing data from the surface patch associated with the primitive, the data comprising tessellation factors and topology data; selecting an initial patch based on the primitive ID, and at least partially tessellating the initial patch with one or more sub-division stages, wherein at each stage of sub-division, it is determined whether to perform sub-division and which of any newly formed sub-patches to further sub-divide based on a sequence of one or more bits in the ID of the primitive.

A third aspect provides a method of performing tessellation in a computer graphics system, the method comprising: receiving, in a tessellation unit, an ID of a primitive; truncating the ID of the primitive in a plurality of different places to generate IDs of each vertex in the primitive; for a sub-set of the vertices in the primitive, truncating the ID of the vertex ID of the vertex in a plurality of different places to generate IDs of parent vertices; using the vertex IDs to calculate UV coordinates for each vertex in the primitive and the parent vertices for the sub-set of the vertices in the primitive; and generating, using a Domain Shader, vertex data for each vertex in the primitive from the calculated UV coordinates.

A fourth aspect provides a tessellation unit configured to perform tessellation in a computer graphics system, the tessellation unit comprising hardware logic arranged to: sub-divide an initial patch into a plurality of primitives using a plurality of sub-division steps; and generate a primitive ID for each primitive, wherein the primitive ID encodes data about how the primitive was generated by the plurality of sub-division steps.

A fifth aspect provides a computer graphics system comprising: a first tessellation unit as described herein; and a second tessellation unit comprising hardware logic arranged to: receive, in a tessellation unit, an ID of a previously tessellated primitive and a surface patch reference; access data from the surface patch associated with the primitive, the data comprising tessellation factors and topology data; select an input patch based on the data from the surface patch associated with the primitive and subdivide the input patch into one or more initial patches; select an initial patch based on the primitive ID, and at least partially tessellate the initial patch with one or more sub-division stages, wherein at each stage of sub-division, it is determined whether to perform sub-division and which of any newly formed sub-patches to further sub-divide based on a sequence of one or more bits in the ID of the primitive.

A sixth aspect provides a computer graphics system comprising: a first tessellation unit as described herein; a second tessellation unit comprising hardware logic arranged to: receive, in a tessellation unit, an ID of a primitive; truncate the ID of the primitive in a plurality of different places to generate IDs of each vertex in the primitive; for a sub-set of the vertices in the primitive, truncate the ID of the vertex ID of the vertex in a plurality of different places to generate IDs of parent vertices; and use the vertex IDs to calculate UV coordinates for each vertex in the primitive and the parent vertices for the sub-set of the vertices in the primitive; and a domain shader comprising hardware logic arranged to generate vertex data for each vertex in the primitive from the calculated UV coordinates.

A seventh aspect provides a tessellation unit configured to perform tessellation in a computer graphics system, the tessellation unit comprising hardware logic arranged to: receive, in a tessellation unit, an ID of a previously tessellated primitive and a surface patch reference; access data from the surface patch associated with the primitive, the data comprising tessellation factors and topology data; select an initial patch based on the primitive ID, and at least partially tessellate the initial patch with one or more sub-division stages, wherein at each stage of sub-division, it is determined whether to perform sub-division and which of any newly formed sub-patches to further sub-divide based on a sequence of one or more bits in the ID of the primitive.

An eighth aspect provides a computer graphics system comprising: a tessellation unit comprising hardware logic arranged to: receive, in a tessellation unit, an ID of a primitive; truncate the ID of the primitive in a plurality of different places to generate IDs of each vertex in the primitive; for a sub-set of the vertices in the primitive, truncate the ID of the vertex ID of the vertex in a plurality of different places to generate IDs of parent vertices; and use the vertex IDs to calculate UV coordinates for each vertex in the primitive and the parent vertices for the sub-set of the vertices in the primitive; and a Domain Shader comprising hardware logic arranged to generate vertex data for each vertex in the primitive from the calculated UV coordinates.

The hardware tessellator or other hardware configured to perform any of the methods described herein, such as a separate Single Primitives Tessellator (or a graphics pipeline comprising the hardware) may be embodied in hardware on an integrated circuit. There may be provided a method of manufacturing, at an integrated circuit manufacturing system, a tessellation unit configured to perform one of the ordering methods described herein. There may be provided an integrated circuit definition dataset that, when processed in an integrated circuit manufacturing system, configures the system to manufacture a hardware tessellator or other hardware configured to perform any of the methods described herein, such as a separate Single Primitives Tessellator. There may be provided a non-transitory computer readable storage medium having stored thereon a computer readable description of an integrated circuit that, when processed, causes a layout processing system to generate a circuit layout description used in an integrated circuit manufacturing system to manufacture a hardware tessellator or other hardware configured to perform any of the methods described herein, such as a separate Single Primitives Tessellator.

There may be provided an integrated circuit manufacturing system comprising: a non-transitory computer readable storage medium having stored thereon a computer readable integrated circuit description that describes a hardware tessellator or other hardware configured to perform any of the methods described herein, such as a separate Single Primitives Tessellator; a layout processing system configured to process the integrated circuit description so as to generate a circuit layout description of an integrated circuit embodying the hardware tessellator or other hardware configured to perform any of the methods described herein, such as a separate Single Primitives Tessellator; and an integrated circuit generation system configured to manufacture a hardware tessellator or other hardware configured to perform any of the methods described herein, such as a separate Single Primitives Tessellator, according to the circuit layout description.

There may be provided computer program code for performing a method as described herein. There may be provided non-transitory computer readable storage medium having stored thereon computer readable instructions that, when executed at a computer system, cause the computer system to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIGS. 9A, 9B and 9C show three graphical representations of parts of the method of FIGS. 8A and 8B when used with a known tessellation scheme;

FIG. 15 is a table defining the second function, γ, shown in FIG. 8A.

Figure 1A:
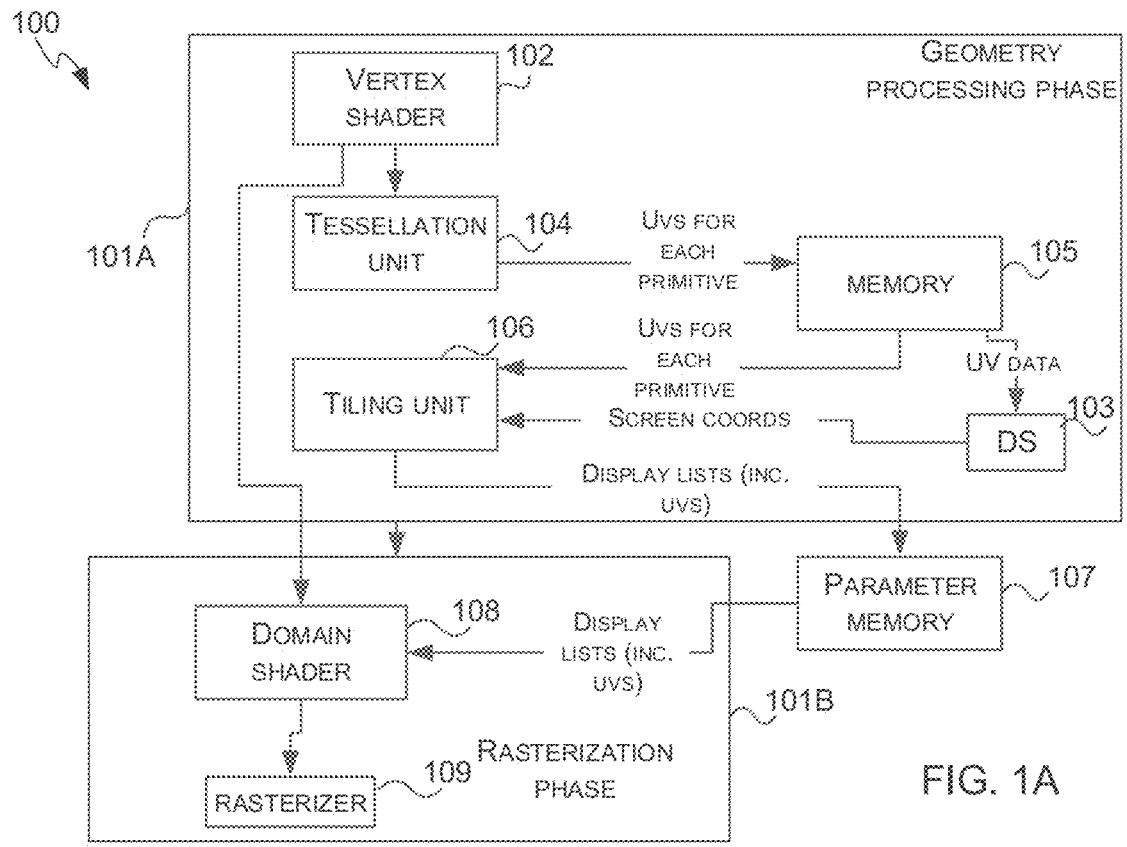
FIG. 1A is a schematic diagram of a known GPU pipeline.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, tessellation involves the selective sub-division of patches, which are typically square or triangular in shape, into smaller triangular patches. The determination as to whether a patch should be sub-divided or not is often made based on one or more tessellation factors (TFs), e.g. by comparing one or more TFs to each other and/or to a threshold value. In some examples edge tessellation factors are used, with each edge of a patch having an edge tessellation factor, and the edge tessellation factor defining how many times the particular edge (and hence the patch which it is part of) should be sub-divided. In other examples (such as in the methods described in GB2533443 and GB2533444) vertex tessellation factors are used, with each vertex (or corner) of a patch having a vertex tessellation factor.

The term 'surface patch' is used herein to refer to a, usually finite, N-dimensional surface (or in the case of an isoline, an N-dimensional curve segment) which is the result of applying a parametric mapping function to a bounded 2D domain, which is a quadrilateral, triangle or other polygon, (or in the case of an isoline, a 1D line segment). The resulting surface or isoline can be considered N-dimensional as it may include not only 3 (or 4) dimensions for Cartesian (or homogeneous) spatial positioning, but also other parameters such as texture coordinates. As described above, surface patches may be curved to fit to the surface of the object they represent and/or have displacement mapping applied. Tessellation (i.e. the sub-division of patches), however, is not performed in 'world space' (i.e. it is not performed on curved surface patches) but is instead performed in domain space (which may also be referred to as parametric space or parameter space or UV space) in which any position in the domain can be described by two coordinates (u,v) known as the domain space coordinates, which means that the tessellation process is independent of any curvature present in the final surface.

The term 'patch' is used herein to refer to an ordered set of two, three, four or more vertices (for an isoline, triangle, quad or polygon respectively) which bound a domain. The term 'domain' therefore refers to the two-dimensional space bounded by the vertices of a patch. The term 'input patch' is used to refer to a patch which is selected by a tessellation unit based on an input topology and again this input patch refers to an ordered set of vertices. In examples where the tessellation unit performs a pre-processing stage which sub-divides the input patch before repeatedly applying a tessellation algorithm to patches formed by the pre-processing stage, the patches formed in the pre-processing stage are referred to herein as 'initial patches'. Patches which are formed by the sub-division of initial patches are referred to herein as 'sub-patches'. The term 'primitive' is used herein to refer to a patch (e.g. an initial patch or sub-patch) that is output by the tessellation unit because it requires no further sub-division and whilst each primitive corresponds to a patch (i.e. an initial patch or sub-patch) it may be in a different form from the patch (e.g. a primitive may comprise indices rather than an ordered set of vertices). Whilst input patches, initial patches and sub-patches are often triangles and the examples below show triangles, in other examples, the input patches, initial patches and/or sub-patches may be isolines or any form of polygon.

Figure 14A:
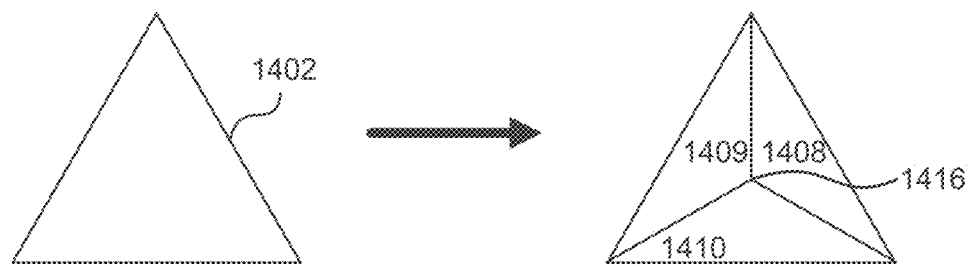
FIGS. 14A and 14B are schematic diagrams illustrating a pre-processing stage of the tessellation methods described herein.
Figure 14B:
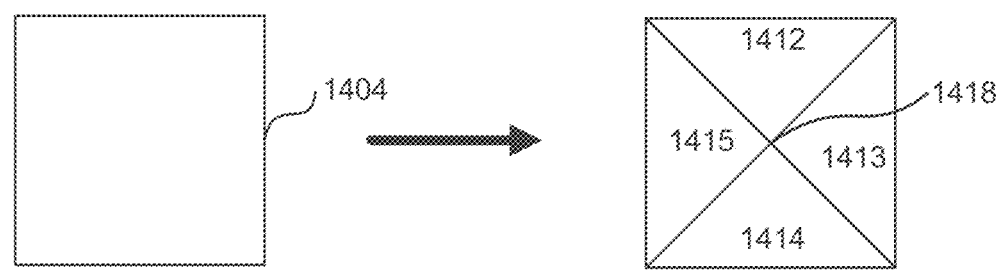

An example of a pre-processing stage to generate initial patches is described in GB2533443 and shown in FIGS. 14A and 14B. The pre-processing stage is used to ensure tessellation is independent of orientation. If the input patch is a triangle patch 1402, the pre-processing stage outputs either one triangle patch 1402 (which is the same as the input triangle patch and where no tessellation is required) or three triangle patches 1408-1410, as shown in FIG. 14A. If the input patch is a quad patch 1404, the pre-processing stage outputs four triangle patches 1412-1415, as shown in FIG. 14B. Similar techniques may also be applied to an input polygon patch to sub-divide it into a plurality of initial triangle patches.

The term 'vertex' is used generally to describe a location plus other attributes, where these attributes differ depending upon the context. For example, input control points and output vertices from a domain shader comprise a 3D position plus other parameters such as the normal, tangent, texture, etc. (and may be referred to as 'world space vertices'), whereas the vertices within the tessellator (i.e. those used within the tessellation method as elements of a patch) comprise a domain space coordinate and a vertex tessellation factor (and may be referred to as 'tessellator vertices'). These vertices within the tessellator are therefore not the same as the input control points or the resulting N-dimensional vertices that form the final triangles.

FIG. 1A shows a schematic diagram of an example graphics processing unit (GPU) pipeline 100 which may be implemented in hardware within a GPU and which uses a tile-based rendering approach. As shown in FIG. 1A, the pipeline 100 comprises a geometry processing phase 101A and a rasterization phase 101B. The geometry processing phase 101A comprises the tessellation unit 104 and vertex shader 102 which is responsible for performing per-vertex calculations. The vertex shader 102 has no knowledge of the mesh topology and performs per-vertex operations so that it only has information of the current vertex that is being processed. Between the vertex shader 102 and the tessellation unit (or tessellator) 104 there may be one or more optional hull shaders, not shown in FIG. 1A. The geometry processing phase 101A further comprises a geometry specific domain shader (DS) 103, a tiling unit 106 and may also comprise other elements, such as a memory 105 and/or other elements not shown in FIG. 1A.

Unlike the vertex shader, the hardware tessellation unit 104 (and any optional hull Shaders) operates per-patch and not per-vertex. The tessellation unit 104 outputs primitives and in systems which use vertex indexing, an output primitive takes the form of three vertex indices and a buffer of vertex data (e.g. for each vertex, a UV coordinate and in various examples, other parameters such as a displacement factor and optionally parent UV coordinates). Where indexing is not used, an output primitive takes the form of three domain vertices, where a domain vertex may comprise only a UV coordinate or may comprise a UV coordinate plus other parameters (e.g. a weight, such as a displacement factor, and optionally, parent UV coordinates). The data output by the tessellator 104 may be stored in memory 105.

The geometry specific domain shader 103 in the geometry processing phase 101A generates the projected positions of the corners of the primitives. The tiling unit 106 reads the data generated by the tessellator 104 from memory 105 and uses this data, along with the projected positions generated by the geometry specific domain shader 103, to generate per-tile display lists. The display lists are then output to the parameter memory 107. Each per-tile display list identifies, for a particular tile, those primitives which are at least partially located within that tile. These display lists may be generated by the tiling unit 106 using a tiling algorithm. Subsequent elements within the GPU pipeline, such as the rasterization phase 101B, can then read the data from parameter memory 107.

Although FIG. 1A shows use of a geometry specific domain shader 103 to calculate the projected positions of the new primitives in screen space (referred to as the 'screen coordinates'), in other examples, a full domain shader (similar to domain shader 108) or alternative dedicated hardware may be used to perform these calculations of screen coordinates for the primitives. In other examples which do not comprise a geometry specific domain shader 103, hardware may be provided that is arranged to estimate the screen coordinates of the new primitives.

The domain shader 108, which is part of the rasterization phase 101B, acts as a second vertex shader for vertices produced by the tessellator 104 and is executed once per vertex per primitive per tile, although caching may be used to enable reuse of shaded vertices. The domain shader is supplied with a domain space location (u,v) and is given all patch information (e.g. from the vertex shader) and outputs a full vertex structure. The domain shader uses the patch control points and the domain space coordinates to build the new vertices and applies any displacement mapping (e.g. by sampling a height map encoded in a texture). The domain shading (in the domain shader 108) may be left as late as possible in the GPU pipeline 100 because it greatly enlarges the space required to store each vertex. After the domain shader 108 has run for each generated vertex of each patch, the data for each tile is further processed in the rasterizer 109 and some or all of the primitives are rendered.

In order that the vertex data is available for rendering (e.g. for the domain shader 108 and rasterizer 109), the vertex data generated by the tessellator 104 may be stored according to a tiling storage scheme. In a first example scheme, the vertex data may be stored in the lists of primitives for each group (or tile) generated by the tiling unit 106, e.g. where the primitives are output in the form of triples of vertex UVs, and in another example scheme, the vertex data may be stored together and the lists of primitives may comprise references to this data. Alternatively, the vertex data (e.g. the contents of the buffer of vertex UVs in memory 105) may be discarded (e.g. after the tiling unit 106) and only primitive identifiers may be retained in the display lists (and stored in memory 107). When the vertex data is needed (e.g. by the domain shader 108), the tessellation process may be re-run and data for those primitives which are not required (e.g. for a particular display list) is discarded or not generated at all. Storing the vertex data (e.g. the UV coordinates and in some examples, additional vertex attributes) in the display lists (and hence in memory 107) uses a large amount of storage and bandwidth (e.g. between the GPU and the system memory) and so discarding the vertex data and subsequently regenerating it, saves on both storage and bandwidth; however, regenerating the vertex data by rerunning the tessellation for all primitives is inefficient.

Described herein is a method of generating IDs for primitives which are output from a tessellation unit (which may alternatively be referred to as a tessellator) where these primitive IDs encode information about how the primitives were generated, rather than simply indicating the order in which the primitives were output from the tessellation unit. A tessellation unit (or tessellator) that implements this method is also described. Using the primitive IDs as described herein, the vertex data can be discarded and not stored in the display lists (thereby saving both storage and bandwidth) and instead of rerunning the tessellation, the primitive ID can be used to generate the vertex data, e.g. in the tessellation unit or in a separate, dedicated piece of hardware logic. Also described herein are methods of generating vertex data for a primitive using its primitive ID, including methods that do not involve re-running a tessellation unit which performs subdivision, either in full or for a single primitive, and hardware that implements these methods.

Figure 1B:
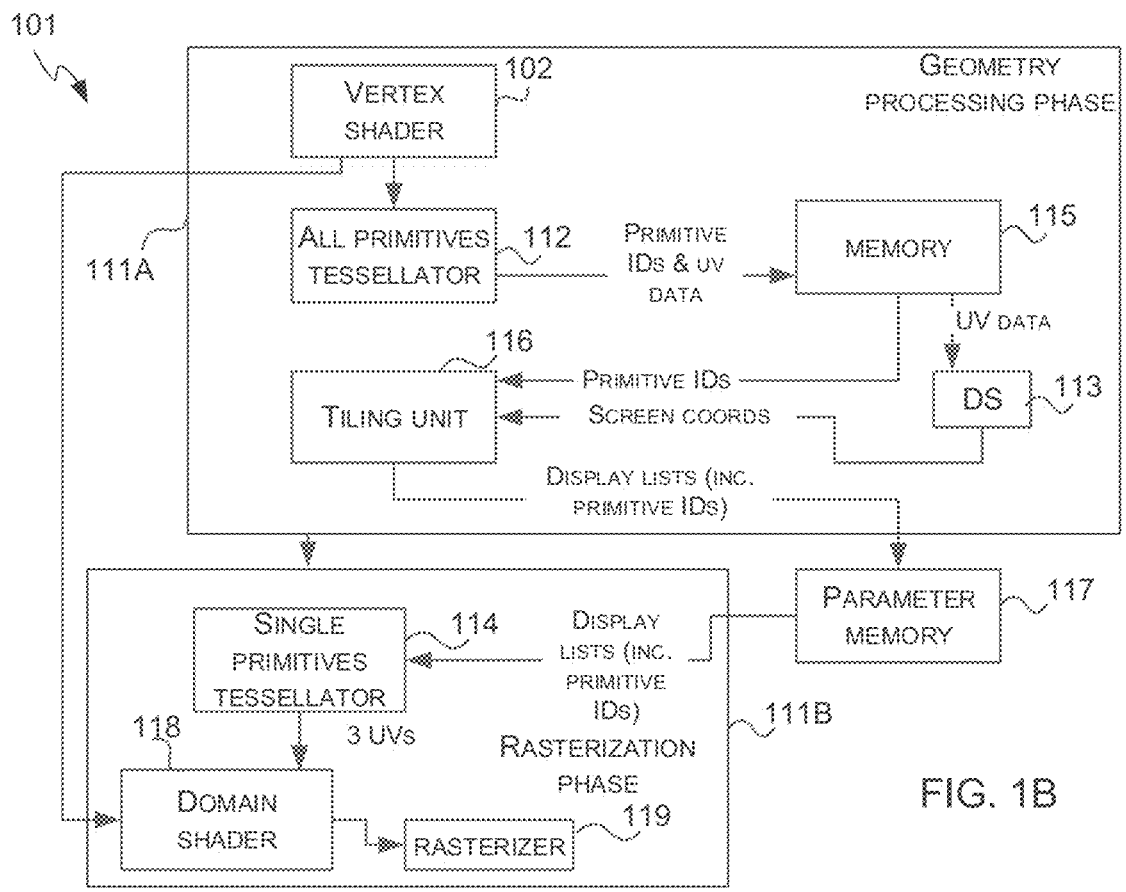
FIG. 1B is a schematic diagram of an improved GPU pipeline.

The methods described herein may be implemented in hardware, such as in an improved GPU pipeline 101 as shown in FIG. 1B. As shown in FIG. 1B, the pipeline 101 comprises a geometry processing phase 111A and a rasterization phase 111B. The geometry processing phase 111A comprises a vertex shader 102 which is responsible for performing per-vertex calculations. As described above with reference to FIG. 1A, the vertex shader 102 has no knowledge of the mesh topology and only knows the current vertex that has been fed into it. The geometry processing phase 111A also comprises an All Primitives Tessellator 112, memory 115, geometry specific domain shader (DS) 113 and a tiling unit 116. Between the vertex shader 102 and the All Primitives Tessellator 112 there may be one or more optional hull shaders, not shown in FIG. 1B.

Unlike the vertex shader 102, the All Primitives Tessellator 112 (and any optional hull shaders) operates per-patch and not per-vertex.

The All Primitives Tessellator 112 is configured to perform the initial, full tessellation and to generate the primitives and their IDs as well as the vertex data. In various examples, the All Primitives Tessellator 112 outputs a list of primitives (e.g. in the form of a UV buffer and an index buffer where indexing is used, or a primitive buffer of UV triples if indexing is not used). An ID buffer (that matches the primitive order) is also generated by the All Primitives Tessellator 112 and the primitive list and ID buffer may be stored in memory 115.

The geometry specific domain shader 113 in the improved GPU pipeline 101 generates the projected positions (i.e. the screen coordinates) of the corners of the primitives. The tiling unit 116 then uses the projected positions (as generated by the geometry specific domain shader 113) to determine which primitives are at least partially located in each tile and to generate corresponding per-tile display lists. The primitive IDs or references to these IDs (dependent upon the tiling storage scheme used) are stored in respective display lists (e.g. in parameter memory 117—i.e. in the list of primitives partially visible in each tile) rather than the UV coordinates that may then be discarded. The primitive IDs are more compact than the three UV coordinates and hence this saves memory usage and bandwidth (and hence the size of parameter memory 117 may be much smaller than the corresponding parameter memory 107 in the GPU pipeline 100 shown in FIG. 1A and such an arrangement would use less power). References to the surface patch control points (including tessellation factors) are also stored (e.g. in parameter memory 117).

Although the description above and FIG. 1B shows use of a geometry specific domain shader 113 to calculate the projected positions of the new primitives in screen space (referred to as the 'screen coordinates'), in other examples, a full domain shader (similar to domain shader 118) or alternative dedicated hardware may be used to perform these calculations of screen coordinates for the primitives. In other examples which do not comprise a geometry specific domain shader 113, hardware may be provided that is arranged to estimate the screen coordinates of the new primitives.

When a tile is to be rasterized (in the rasterization phase 111B), each primitive ID in the display list for the tile is transformed into a triple of UV coordinates (which may be abbreviated to 'a triple of UVs') using a Single Primitives Tessellator 114. The Single Primitives Tessellator 114 is configured to generate vertex data from an input primitive ID and whilst this is shown as part of the rasterization phase 111B (because this is where it is positioned in the data flow), it may be physically close to, or integrated with the All Primitives Tessellator 112, e.g. such that logic can be reused between the All Primitives Tessellator 112 and the Single Primitives Tessellator 114. The two tessellators 112, 114, where they are physically co-located or integrated may be referred to collectively as an improved tessellation unit.

The domain shader 118 in the rasterization phase 111B acts as a second vertex shader for vertices produced by the single primitives tessellator 114 and is executed once per vertex per primitive per tile, although caching may be used to enable reuse of shaded vertices. The domain shader 118 is supplied with a domain space location (u,v) and is given all patch information and outputs a full vertex structure. The domain shader uses the patch control points and the domain space coordinates to build the new vertices and applies any displacement mapping (e.g. by sampling a height map encoded in a texture). The domain shading (in the domain shader 118) may be left as late as possible in the GPU pipeline 101 because it greatly enlarges vertex sizes (e.g. in terms of the number of bits of data for each vertex). Where the domain shader 118 and the geometry specific domain shader 113 are implemented separately, the domain shader 118 may be larger in size than the geometry specific domain shader 113 because it may also be configured to process other side band data in addition to the geometry data.

After the domain shader 118 has run for each vertex generated by the single primitives tessellator 114, the data for each tile is further processed in the rasterizer 119 and some or all of the primitives are rendered.

As described above, the method of generating primitive IDs described herein and the method of generating vertex data for a primitive (e.g. a single primitive) from its primitive ID may be implemented within the All Primitives Tessellator 112 and Single Primitives Tessellator 114 respectively, or within an improved tessellation unit that incorporates the functionality of both tessellators 112, 114.

The GPU pipeline 101 of FIG. 1B is shown by way of example only and the improved tessellation methods described herein may be used in any GPU architecture. It will also be appreciated that the All Primitives Tessellator 112 and/or Single Primitives Tessellator 114 may be used in a GPU pipeline which comprises other shaders in addition to, or instead of, a vertex shader 102, an optional hull shader and a domain shader 118.

The All Primitives Tessellator 112 and Single Primitives Tessellator 114 may be implemented in hardware. The methods described herein may alternatively be implemented in software (or a combination of software and hardware) and example computing-based device which may be configured to implement the tessellation methods described above is described below with reference to FIG. 11.

Although not described above, the vertex data may be compressed when stored in memory (e.g. in memory 105 and/or parameter memory 107 in FIG. 1A and in memory 115 and/or parameter memory 117 in FIG. 1B).

Figure 2A:
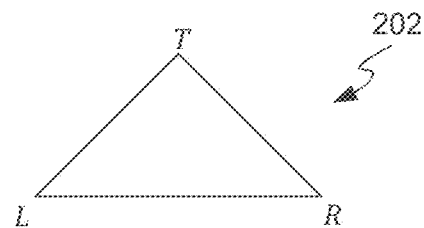
FIGS. 2A-2E show schematic diagrams illustrating tessellation of a triangle input patch.
Figure 2B:
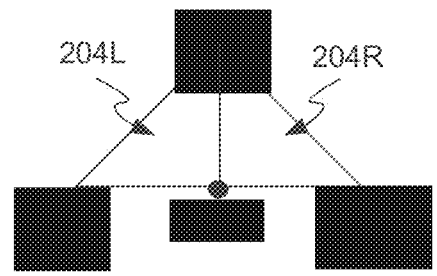
Figure 2C:
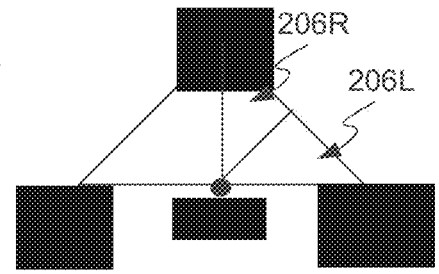

Tessellation methods may be recursive, as can be described with reference to FIGS. 2A-2E and 3A. FIG. 2A shows an example triangle initial patch 202 and FIG. 3A is a flow diagram showing a tessellation method. Although in the example shown in FIGS. 2A-E the initial patch is a triangle patch, in other examples, the initial patch may be an isoline or a polygon with any number of sides. As described above, a triangle patch is an ordered set of three vertices which bound a domain and in the examples described herein, this ordered set of vertices is written (T, L, R), where T, L and R refer to the top, left and right vertices respectively (as shown in FIG. 2). References to patches or sub-patches in the methods described herein refer to the ordered set of vertices (i.e. data that represents the patch).

The tessellation of the initial patch 202 starts by making an assessment to determine whether sub-division of the initial patch 202 is required (block 302). This determination (in block 302) may be made using any suitable tessellation method (e.g. any tessellation method that involves binary sub-division) and two examples which use vertex tessellation factors are described in GB2533443 and GB2533444 (although this method applies to quad patches and not to triangle patches). Other tessellation methods may alternatively be used.

If it is determined that the initial patch does not need to be sub-divided ('No' in block 302), then the initial patch is output as a primitive (block 304). If, however, it is determined that the initial patch needs to be sub-divided ('Yes' in block 302) then left and right sub-patches 204L, 204R are formed (block 306). This sub-division of the initial patch 202 may comprise adding a mid-vertex (denoted M) on the edge between the left and right vertices (as shown in FIG. 2B) and in various examples the mid-vertex may be added at the mid-point between the left and right vertices. Both of these patches 304L, 304R which are formed (in block 306) are triangle patches and comprise an ordered set of three vertices: (M, R, T) and (M, T, L), and they may be referred to as the right sub-patch 204R and the left sub-patch 204L respectively. As described above, although in the example shown in FIGS. 2A-E the initial patch is a triangle patch, in other examples, the initial patch may be an isoline or a polygon with any number of sides.

At the next stage in the tessellation, each of the sub-patches are selected to be further tessellated in turn using the method of FIG. 3A (block 308), such that the method of FIG. 3A is applied recursively. Only when the first selected sub-patch of the initial sub-patch has been tessellated such that no further sub-division is required, is the second of the sub-patches formed from the sub-division of the initial patch selected (in block 308) and input to the method of FIG. 3A. If, for example, the right sub-patch 204R (from FIG. 2B) is selected first (in block 308), input into the method of FIG. 3A and then sub-divided (in block 306), there are two sub-patches 206R and 206L (as shown in FIG. 2C) which are again selected in turn (in block 308) to be input into the tessellation method of FIG. 3A. If it is determined that the first of these (e.g. 206L) does not need to be sub-divided ('No' in block 302), then the next of these (e.g. 206R) is input to the tessellation method of FIG. 3A. Once this sub-patch has been fully tessellated (to the degree required), then the method returns to the top level of recursion and the second of the sub-patches formed from the initial patch (e.g. 204L) is input into the method of FIG. 3A and applied recursively to any sub-patches formed from that sub-patch (e.g. sub-patches 208L and 208R). The method continues until all the sub-patches formed from the initial patch have been assessed and it has been determined that they do not need to be sub-divided ('No' in block 302). The sub-patches (and initial patches, if they are not subdivided), once output, may be referred to as primitives because they do not require any further subdivision.

Figure 3A:
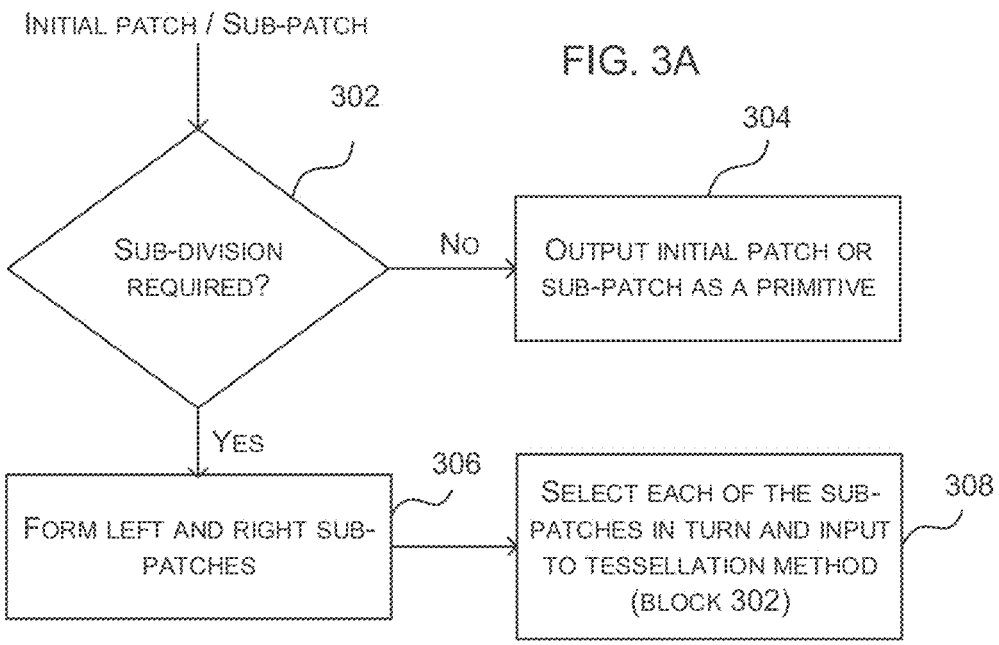
FIG. 3A is a flow diagram showing a first example tessellation method.
Figure 3C:
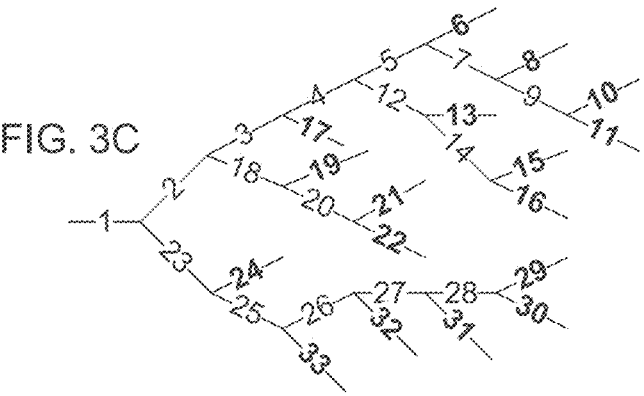
FIG. 3C is a schematic diagram showing an example order in which the tessellation method of FIG. 3A is applied.

Using the method of FIG. 3A, the tessellation method is applied recursively at each level of sub-division of an initial patch with one branch of the sub-division tree being sub-divided fully, before assessing the other branch of the sub-division tree, as shown graphically in FIG. 3C where each branch represents a sub-patch and the number on each branch indicates the order in which the sub-patch is input into FIG. 3A. Those sub-patches which are output as primitives (in block 304) have their order number in FIG. 3C shown in bold.

Figure 4A:
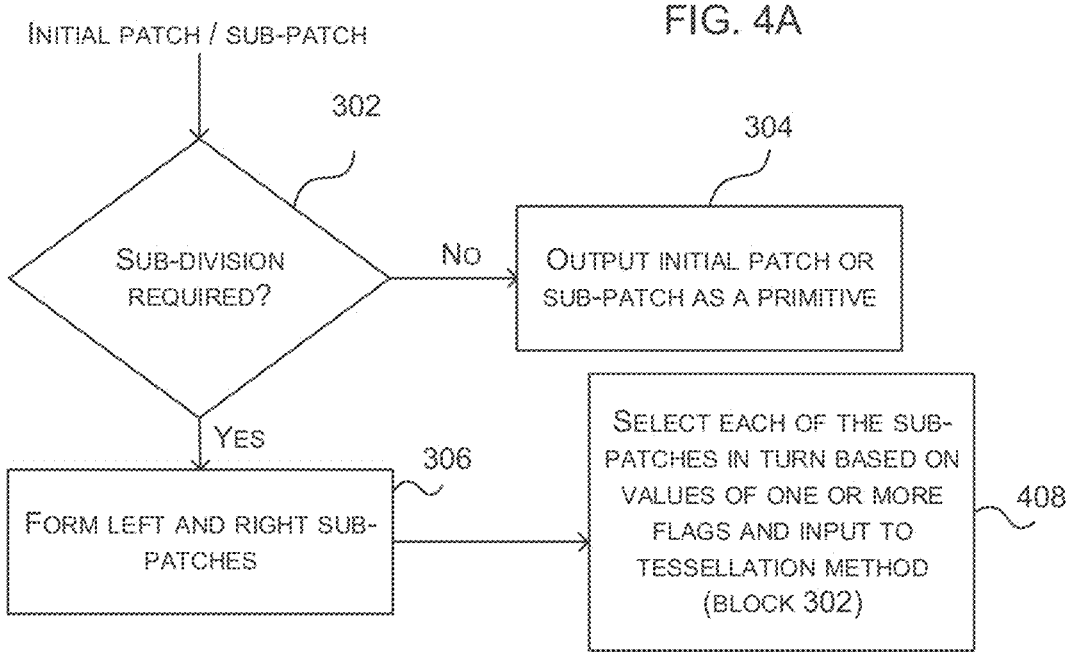
FIG. 4A is a flow diagram showing a second example tessellation method in which the primitives are generated according to an 'improved ordering'.

The order in which primitives are output by the tessellation unit (in block 304) depends upon the order in which sub-patches are selected for assessment (in block 308), as also shown in FIG. 3C. Different criteria may be used to select a patch at each sub-division, or branching, point (in block 308) and FIG. 4A shows an example tessellation method that, with a particular encoding of patch selection for each sub-divided patch, alternates the order that sub-patches are processed for each level of sub-division within the tessellation unit and as a consequence of this, adjacent primitives in the ordering are guaranteed to be neighbouring primitives in UV space and thus share two vertices. This ordering of output primitives may be referred to as 'improved ordering'.

The method shown in FIG. 4A takes initially as an input, an initial patch, which may, for example, be a triangle patch 202, and an assessment is made to determine whether sub-division of the initial patch 202 is required (block 302). This determination may be made using any suitable tessellation method (e.g. any tessellation method that involves binary sub-division) and two examples which use vertex tessellation factors are described in GB2533443 and GB2533444.

If it is determined that the initial patch does not need to be sub-divided ('No' in block 302), then the initial patch is output as a primitive (block 304). If, however, it is determined that the initial patch needs to be sub-divided ('Yes' in block 302), then left and right sub-patches are formed (block 306). This sub-division of the initial patch 202 may comprise adding a mid-vertex (denoted M) on the edge between the left and right vertices (as shown in FIG. 2B) and in various examples the mid-vertex may be added at the mid-point between the left and right vertices. Both of these sub-patches 204L, 204R which are formed (in block 306) are triangle patches in the example shown and comprise an ordered set of three vertices: (M, R, T) and (M, T, L) but in other examples they may be isolines or have more than three sides, and they may be referred to as the right sub-patch 204R and the left sub-patch 204L respectively.

One of the newly formed sub-patches (i.e. the left sub-patch 204L or the right sub-patch 204R formed in block 306) is then selected (in block 408) to be further tessellated ahead of the other of the newly formed sub-patches by inputting the selected sub-patch back into the method of FIG. 4A. The order of selection of the left or right sub-patch (in block 408) is made based on the values of one or more flags and two different examples of the use of flags are described below. In this way, the method of FIG. 4A is applied recursively at each level of sub-division of an initial patch with one branch of the sub-division tree being sub-divided fully, before assessing the other branch of the sub-division tree (e.g. in a similar manner to that shown graphically in FIG. 3C, however with the order of selection at each branching point being determined by the one or more flags).

In a first example, there is a flag (e.g. a single bit flag) for each patch (e.g. for each initial patch and for each sub-patch which is subsequently formed by tessellation). This per-patch flag determines whether the left sub-patch or the right sub-patch is selected first and input back into the method of FIG. 4A (in block 408) when that patch is sub-divided, i.e. when sub-dividing the initial patch (in block 306), it is the flag associated with the initial patch that determines the selection order made in the subsequent step (in block 408). In such an example, this makes a triangle patch an ordered set of three vertices and a flag, e.g. (T, L, R, F) or (T, L, R, F̄) where F and F̄ represent the two different flag values (e.g. off and on, 1 and 0).

If the flag of the initial patch 202 (which is being sub-divided in block 306 as a consequence of the assessment in block 302) has a first value of the flag (e.g. F) then the right sub-patch is selected and input back into the method of FIG. 4A first (in block 408) and the left sub-patch is input back into the method of FIG. 4A (i.e. tessellated as needed) only when no further sub-division of the right sub-patch is possible. If, however, the flag of the initial patch 202 has the other value (e.g. F̄) then the left sub-patch is selected and input back into the method of FIG. 4A first (in block 408) and the right sub-patch is input back into the method of FIG. 4A (i.e. tessellated as needed) only when no further sub-division of the left sub-patch is possible. In such an example, when two sub-patches are generated by sub-division of a parent patch (in block 306, where the parent patch may be the initial patch or a sub-patch formed from the initial patch), the value of the flag for both of the newly formed sub-patches is set to have the opposite value to the parent patch. Consequently, if the initial patch is (T, L, R, F) then the two sub-patches which are formed (in block 306) are (M, T, L, F̄) and (M, R, T, F̄). Similarly, if the initial patch is (T, L, R, F̄) then the two sub-patches which are formed (in block 306) are (M, T, L F) and (M, R, T, F).

In a second example, a single flag may be used in the tessellator which switches state every time the level of recursion decreases or increases by one. In this second example if the single flag has a first value (e.g. F) then the right sub-patch is selected and input back into the method of FIG. 4A first (in block 408) and the left sub-patch is input back into the method of FIG. 4A (i.e. tessellated as needed) only when no further sub-division of the right sub-patch is possible. If, however, the single flag has the other value (e.g.

F) then the left sub-patch is selected and input back into the method of FIG. 4A first (in block 408) and the right sub-patch is input back into the method of FIG. 4A (i.e. tessellated as needed) only when no further sub-division of the left sub-patch is possible. In this example, the swapping of the flag value may, for example, be performed following the decision to sub-divide (e.g. in response to a 'Yes' in block 302) or following the formation of the two sub-patches (in block 306).

As described above, having selected one of the two newly formed sub-patches 204R, 204L (in block 408), the selected sub-patch is input back into the method of FIG. 4A and tessellated until no further sub-division is possible and this is a recursive process. The selected newly formed sub-patch (e.g. patch 204R) becomes an input to the method of FIG. 4A and it is determined whether that sub-patch should be sub-divided (in block 302). If no sub-division is required ('No' in block 302), the selected newly formed sub-patch is output as a primitive (block 304) and the non-selected newly formed sub-patch (e.g. patch 204L) is input to the method of FIG. 4A.

If, however, sub-division of the selected sub-patch (e.g. 204R) is required ('Yes' in block 302), left and right sub-patches (206L, 206R) are formed from the selected sub-patch (in block 306). As the flags at this level of recursion have been swapped (either as a consequence of the flag in sub-patch 204R being opposite to that in initial patch 202 or because the single flag was swapped as part of the method of generating the sub-patches 204R, 204L), instead of selecting the right sub-patch 206R first (as was the case at the immediately preceding level of recursion which resulted in the selection of sub-patch 204R), the left sub-patch 206L is selected first (in block 408). If this selected sub-patch 206L does not require any sub-division, it is output as a primitive (in block 304) and the non-selected sub-patch 206R is selected and assessed (in block 302). Only when tessellation of both of these sub-patches 206L, 206R is complete, is the non-selected sub-patch 204L from the top level of tessellation input into the method of FIG. 4A and considered for sub-division (in block 302).

The output primitive (from block 304) takes the form of three indices in systems which use vertex indexing and three domain vertices where indexing is not used and where, as detailed above, a domain vertex may comprise only a UV coordinate or may comprise a UV coordinate plus other parameters (e.g. a weight such as displacement factor and optionally, parent UV coordinates).

Figure 2D:
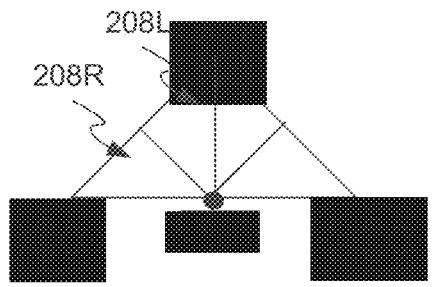

As shown in FIG. 2D, if this non-selected sub-patch 204L requires sub-division ('Yes' in block 302), two new sub-patches are formed, 208L, 208R. The flag used to make the selection (in block 408) has the same values when making a selection between sub-patches 208L and 208R as it did when making a selection between sub-patches 206L and 206R because both sub-divisions occur at the same level of recursion/tessellation and hence the left sub-patch 208L is selected first. If this selected sub-patch 208L does not require any sub-division, it is output (in block 304) and the non-selected sub-patch 208R is selected and assessed (in block 302).

Figure 2E:
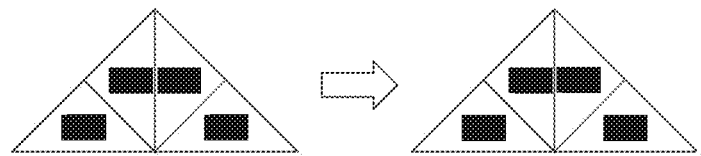

If using the method shown in FIG. 4A, with the particular encoding of a flag bit for sub-patch selection as described above, then the initial patch 202 is sub-divided into four sub-patches 206L, 206R, 208L, 208R, the sub-patches are generated and the primitives output in the following order: 206L, 206R, 208L, 208R and this ordering (with output primitives labelled 0-3 in order) is shown in FIG. 2E.

Figure 4B:
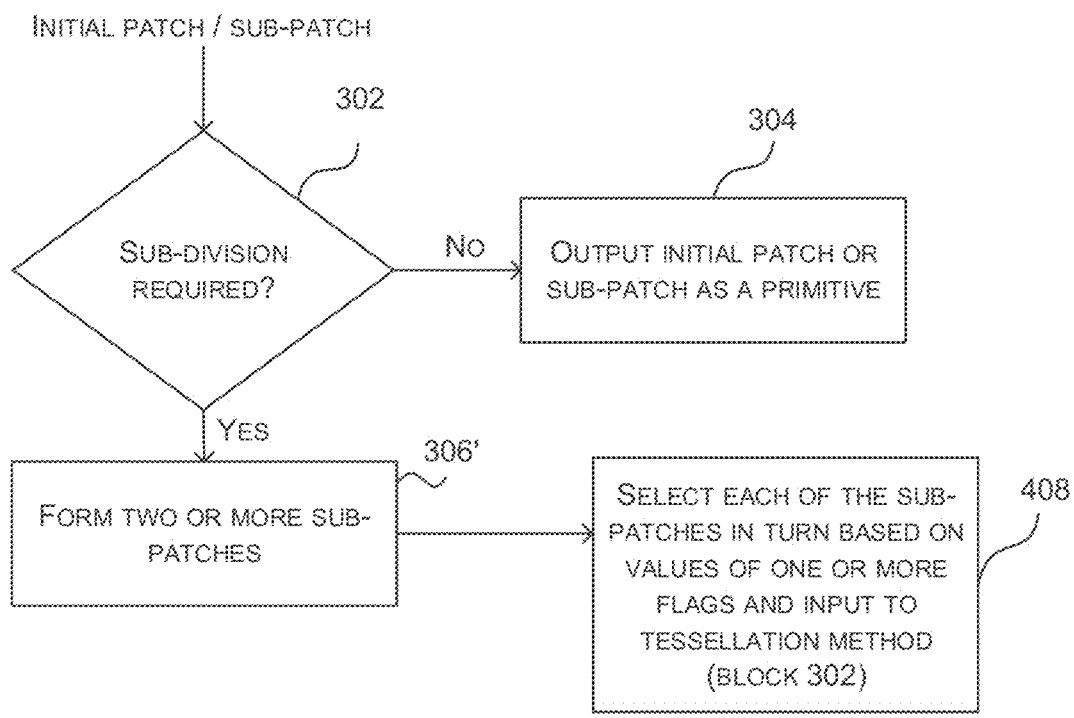
FIG. 4B is a flow diagram showing a variation on the second example tessellation method shown in FIG. 4A.
Figure 5A:
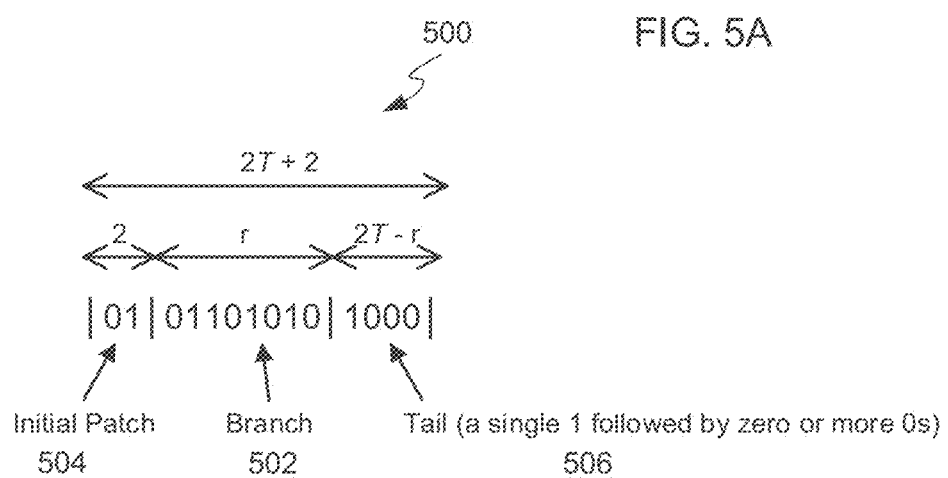
FIGS. 5A and 5B are schematic diagrams showing the structure of an example primitive ID.
Figure 5B:
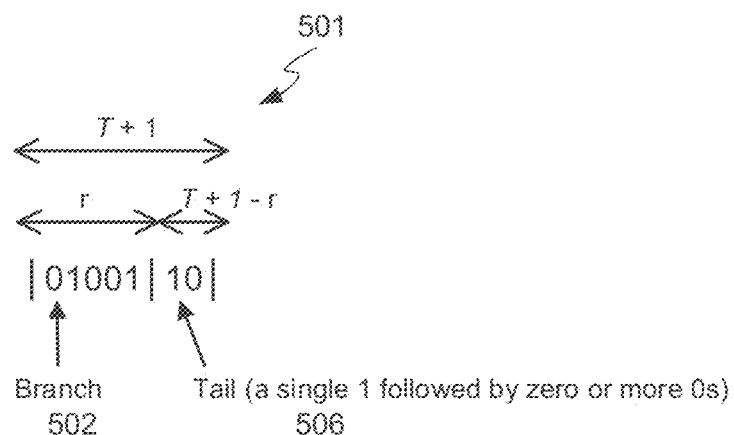

FIGS. 5A and 5B show schematic diagrams of two example primitive IDs 500, 501 which are generated using the methods described herein. As shown in FIGS. 5A and 5B, the primitive ID 500, 501 comprises a sequence of r bits 502 that specifies the recursive sequence taken during the tessellation process (as the process as shown in FIG. 3A or 4). Each bit in the sequence 502 indicates whether at any selection operation (e.g. block 308 in FIG. 3A or block 408 in FIG. 4A), the patch from which the primitive was formed was either selected for subdivision first (e.g. as indicated by a 0) or not selected (e.g. as indicated by a 1). Each bit therefore indicates whether the patch from which the primitive was formed was either tessellated first or second and this may also be described in terms of a branching algorithm, with the sequence of bits 502 indicating whether the first branch was taken (i.e. the patch was selected first for tessellation in block 408) or the second branch was taken (i.e. the patch was the second to be selected in block 408).

In addition to the sequence of r bits 502 that specifies the recursive sequence taken during the tessellation process, the primitive ID 500, 501 may comprise one or more additional bits or bit sequences. Whilst the first example 500 shown in FIG. 5A comprises both a header portion 504 and a tail portion 506, in other examples, the primitive ID may comprise only one of the header portion 504 and the tail portion 506, or may comprise neither the header portion 504 nor the tail portion 506, and/or may comprise other portions. The second example 501 in FIG. 5B, shown to comprise a tail portion only, may include a header portion or not include a tail portion.

In tessellation methods, where an input triangle, quad or polygon patch is sub-divided in a pre-processing step before tessellation (e.g. such that the input triangle, quad or polygon patch is divided into a plurality of initial patches which are each then input into the tessellation method of FIG. 3A or 4A), the primitive ID 500 may comprise a header portion 504 that comprises one or more bits (e.g. 2 bits) that indicate which of those initial patches (formed from the input triangle/quad/polygon patch, e.g. as shown in FIGS. 14A and 14B and described above) the primitive is in.

In various examples, the primitive ID may comprise a tail portion 506 that is used to provide fixed length primitive IDs 500, 501. Without such a tail portion 506, the length of the primitive ID 500, 501 will depend on the length of the recursive sequence (i.e. the value of r) and this may result in ambiguities if the IDs are concatenated (e.g. because the codes are not prefix-free, where the term 'prefix-free' refers to the fact that there are pairs of codes c, d, where c is a prefix of d and hence a parser cannot determine whether they have reached the end of code c or are in the middle of code d). By including a variable length tail portion 506, the length of the primitive ID is fixed, irrespective of the value of r, and the tail portion may comprise a pre-defined bit sequence (e.g. a single 1 followed by zero or more 0 s, as in the examples in FIGS. 5A and 5B) that enables the tail portion 506 to be identified and distinguished from the sequence of bits 502 that specify the recursive sequence taken.

Figure 6:
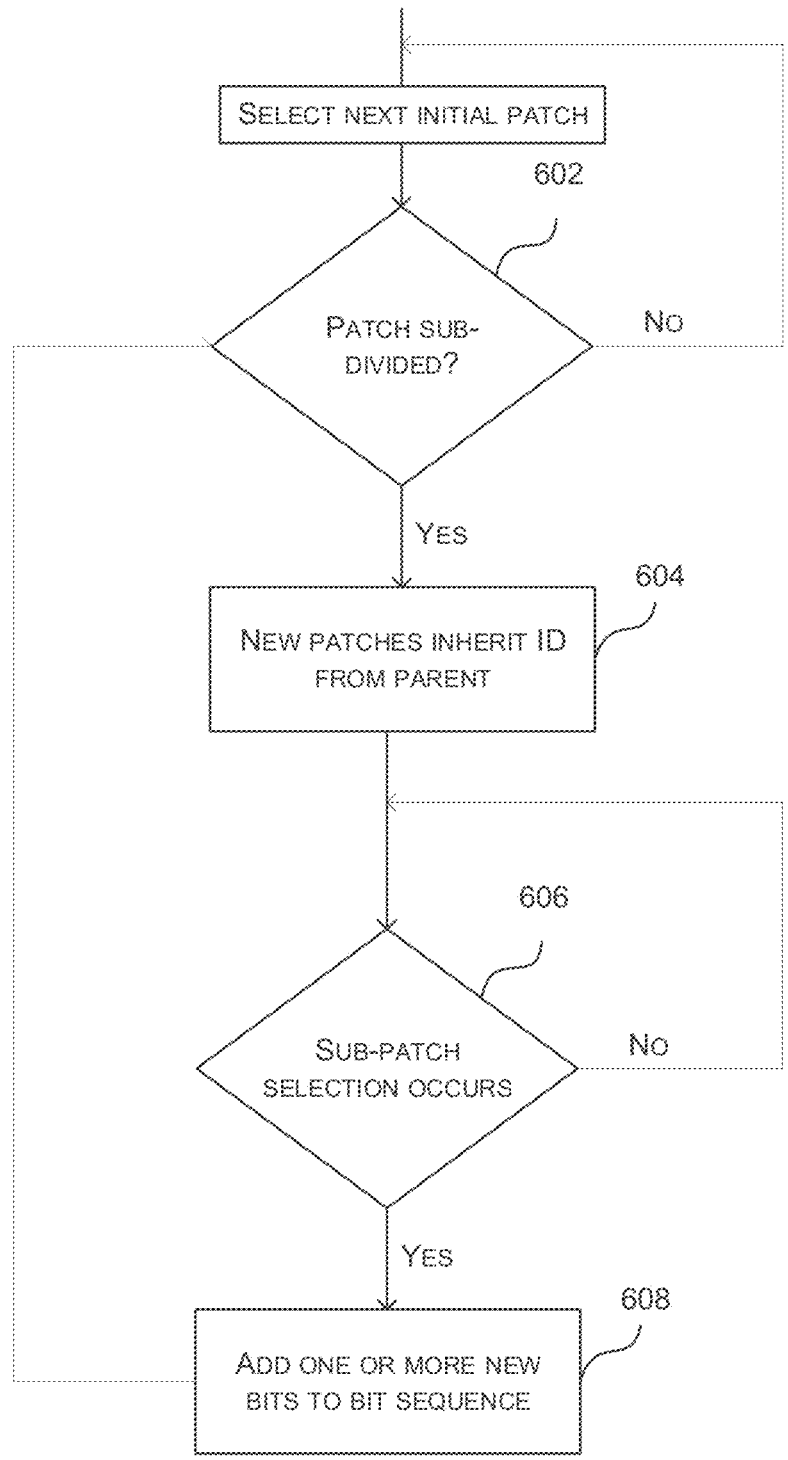
FIG. 6 is a flow diagram of an example method of generating IDs for primitives.

As shown in FIG. 6, to generate the primitive ID, each time a sub-patch is formed ('Yes' in block 602, e.g. in block 306 of FIG. 3A or 4A), it inherits the primitive ID of its parent (block 604) and each time sub-patch selection occurs ('Yes' in block 606, e.g. in block 308 of FIG. 3A or block 408 of FIG. 4A), a further set of bits (e.g. one or more bits) is appended to the sequence of bits 502 that specify the recursive sequence taken (block 608). This addition of a new bits to the sequence 502 (in block 608) may result in one or more bits being removed from the tail portion 506 (where provided) or alternatively and where a tail portion 506 is provided, the tail portion 506 may be added after the recursive sequence 502 has been generated using the method of FIG. 6.

Whilst the method of FIG. 6 is shown separately from the tessellation method (as shown in FIGS. 3A and 4A), it will be appreciated that the two methods may be implemented together such that, the initial generation of the primitive IDs for the newly formed sub-patches which match their parent patches IDs (in block 604) may be implemented as part of the process for sub-dividing initial patches or sub-patches (e.g. in block 306 of FIG. 3A or 4A) and the updating of an ID may be implemented as part of the sub-patch selection operation (e.g. in block 308 of FIG. 3A or block 408 of FIG. 4A).

As shown in FIG. 5A, for a quad or triangle domain (i.e. for primitives formed from an input triangle or quad patch that is subdivided into a plurality of initial patches), the size of the ID may be fixed at 2T+2 bits through use of a variable length tail portion 506, where T is a pre-defined fixed value (which is non-zero) and in various examples may be greater than or equal a maximum Tessellation Factor (e.g. a maximum vertex TF) that may be used for tessellation (i.e. so that the codebook has enough elements to encode all possible primitives). It will be appreciated that where the header portion 502 is omitted or has a length different from two bits, that will change the size of the ID, e.g. to 2T+h bits, where h is the number of bits in the optional header portion 502 (which may, as described above, encode the initial domain sub-division) or more generally to h+bR+1 bits where b is the number of bits added at each level of recursion and R is the maximum number of levels of recursion (and in the examples described herein h=2, b=1 and R=2T−1).

In examples where T is equal to the maximum TF, the length of the primitive ID is minimal (and the codebook is the smallest it can be) and hence this provides an efficient implementation, as demonstrated by the table below:

| Domain | Max # of prims | Inequality | Min bits | Unused codes |
|---|---|---|---|---|
| Quad | $4(2^{2T} - 1)$ | $2^{2T+1} < 2^{2T+2} -$ $4 < 2^{2T+2}$ | 2T + 2 | 000 . . . 0, 010 . . . 0, 100 . . . 0, 110 . . . 0 |
| Tri | $3(2^{2T} - 1)$ | $2^{2T+1} < 3 \cdot 2^{2T} -$ $3 < 2^{2T+2}$ | 2T + 2 | 000 . . . 0, 010 . . . 0, 100 . . . 0, $11b_0 \ldots b_{2T-1}$ |

In the examples described herein, the maximum TF and all tessellation factors are considered log base 2.

As described above, for a triangle, quad or polygon domain where the input patch is pre-processed to sub-divide it into 3, 4 or more initial patches, prior to tessellation, the primitive ID 500 may comprise a header portion 504 which identifies which of those initial patches the primitive is in. For the isoline domain or in other situations where the input patch is not pre-processed, the primitive ID may have a simpler format as in the second example 501 in FIG. 5B. This example ID 501 omits the header portion 504. In such an example and for an isoline domain (where there are half as many levels of subdivision as for quad or triangle domains), the size of the ID may be fixed at T+1 bits through use of a variable length tail portion 506, where, as above, T is a pre-defined fixed value (which is non-zero) and in various examples may be greater than or equal a maximum Tessellation Factor (e.g. a maximum vertex TF) that may be used for tessellation. Again, it can be shown that in examples where T is equal to the maximum TF, the length of the primitive ID is minimal and hence this provides an efficient implementation, as demonstrated by the table below:

| Domain | Max # of prims | Inequality | Min bits | Unused codes |
|---|---|---|---|---|
| Isoline | $2^{T+1} - 1$ | $2^T < 2^{T+1} -$ $1 < 2^{T+1}$ | T + 1 | 0 . . . 0 |

When primitive IDs are output in the same order as their associated primitives generated by the recursive algorithm of the tessellator, and where the bit 0 corresponds to the first sub-patch processed and bit 1 corresponds to the second sub-patch processed, the primitive IDs will be output in lexicographical order. Hence finding where or whether a primitive with a certain ID is present in a buffer can be performed efficiently. This is also the case if more than 1 bit is appended to the sequence at each subdivision step so long as the selection order of sub-patches matches the appended bits ordered lexicographically. Furthermore, the differences between adjacent IDs will generally be small and this may be used to compress blocks of IDs in memory efficiently.

Figure 3B:
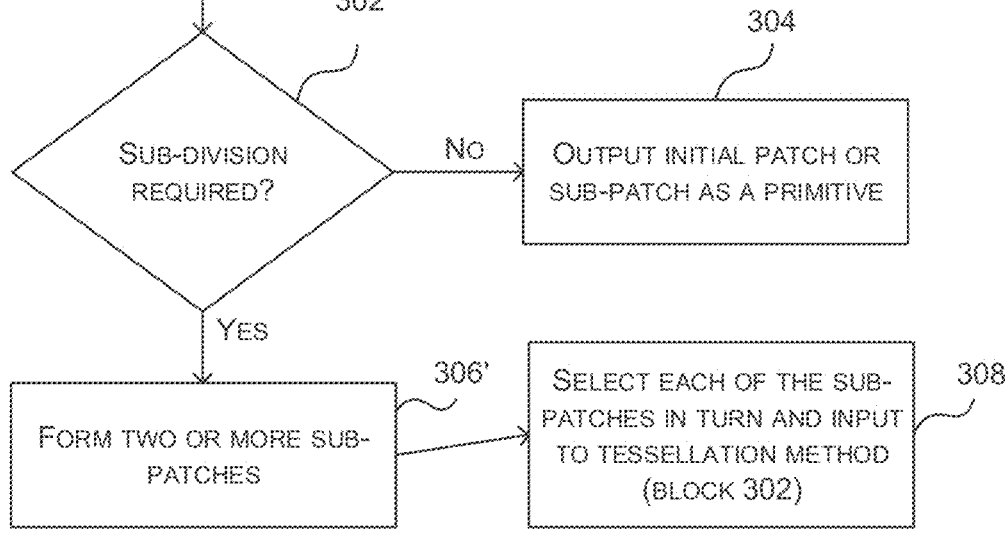
FIG. 3B is a flow diagram showing a variation on the first example tessellation method shown in FIG. 3A.

Whilst the methods of generating IDs are described above in relation to a tessellation method that uses binary sub-division (e.g. as shown in FIGS. 3A and 4A), the methods described herein may also be used where a patch is sub-divided into more than two sub-patches (e.g. into four sub-patches or X sub-patches, where X may often be a power of 2). FIG. 3B shows a further method of tessellation which is variant of the method shown in FIG. 3A (described above) and FIG. 4B shows a further method of tessellation which is variant of the method shown in FIG. 4A (described above).

In the method shown in FIG. 3B, if sub-division is required ('Yes' in block 302), the initial patch, or a sub-patch in subsequent levels of recursion, is sub-divided into two or more sub-patches (block 306', e.g. into X sub-patches). Each of the sub-patches are then selected in turn (in block 308) to be fed back into the method as an input (i.e. into block 302) and the method is repeated until all the sub-patches that were formed (in block 306') have been selected and tessellated until there is no further sub-division.

In the method shown in FIG. 4B, if sub-division is required ('Yes' in block 302), the initial patch, or a sub-patch in subsequent levels of recursion, is sub-divided into two or more sub-patches (block 306', e.g. into X sub-patches). Each of the sub-patches is then selected in turn, with the order of selection being based on the values of one or more flags (block 408) to be fed back into the method of FIG. 4B and tessellated until there is no further sub-division.

The order in which sub-patches are selected (in block 408) is based on the values of more than one flag. More generally, the values of the one or more flags may be considered to encode an ordering for the tessellation of the sub-patches formed from the input patch (in block 306') and each sub-patch may be tessellated in turn (by inputting the sub-patch into the method of FIG. 4B) until there is no further sub-division based on the ordering encoded by the values of the one or more flags.

As described above with reference to FIG. 4A, each initial patch (and sub-patch once formed) may have an associated flag and the values of these flags may be used when selecting a sub-patch (in block 408). In examples where each sub-patch does not have an associated flag (as in the second flag example described above) and where the input patch is sub-divided into X sub-patches, the one or more flags may comprise a small stack of integers (with an entry for each level of recursion) that stores the number of sub-patches formed at each subdivision level, e.g. the value of X for the particular sub-division level where this value may be different for different levels.

If a new subdivision of a patch (e.g. an initial patch or a sub-patch) into X-sub-patches occurs, the value X is pushed onto the stack. Each time a subdivision does not occur the topmost value on the stack is decremented by 1. If the topmost value on the stack reaches zero it is popped off the stack. The subdivision level is then given by the number of elements of the stack, and the order of sub-patch selection (in block 408) may be determined as a function of this level.

In an alternative scheme, if a new subdivision of a patch into X sub-patches occurs, the value X–1 is pushed onto the stack. Each time subdivision of a patch/sub-patch does not occur, and a primitive is output, the topmost value on the stack is decremented by 1, unless this value is 0 in which case it is popped off the stack. If when popping a value off the stack the next one is also 0, it too is popped off the stack. The process terminates when the stack is empty. The sub-division level is then derived from the number of elements of the stack, and the order of sub-patch selection (in block 408) may be determined as a function of this level. This alternative scheme only has X possible values per entry, rather than X+1 as in the case of the previous scheme, meaning each entry may be encoded in fewer bits.

Using the method of FIG. 3B or 4B and where X is a power of 2, two or more levels of sub-division from the method of FIG. 2 may, for example, be performed in one sub-division step (e.g. in one batch before the next patch selection occurs).

Where the tessellation method subdivides an initial patch or a sub-patch into more than two sub-patches (e.g. as in the methods of FIGS. 3B and 4B), the same principle for generating primitive IDs can be used, with a new bit being added to the bit sequence each time sub-patch selection occurs (e.g. as shown in FIG. 6 and described above). For example, when subdividing into a power of two sub-patches (e.g. 8 sub-patches), a plurality of bits (e.g. 3 bits) are added to the end of the primitive ID each time a subdivision occurs, where the bits that are added indicate the position of the sub-patch in the processing order (e.g. the 3 bits indicate whether the sub-patch was processed $1^{st}$, $2^{nd}$, ..., or $8^{th}$). The method of FIG. 6 may be used for any tessellation method which involves recursive sub-division of patches, irrespective of the number of branches at any level. This number of branches need not be a power of 2 however the process is most efficient for powers of 2 when using binary encodings.

In examples where no subdivision occurs, i.e. the initial patch is not subdivided and only a single primitive is output, any unused primitive ID may be assigned to this primitive (e.g. any primitive ID beginning with 11). By using a special primitive ID in this way, the primitive can always be identified as a special case and its vertex IDs may also be generated as a special case from the primitive ID (e.g. 000 . . . 0, 010 . . . 0 and 100 . . . 0).

The methods described herein may also be used for other tessellation methods which do not use recursive sub-division, e.g. where the tessellation method is iterative rather than recursive, such as in DirectX and OpenGL (as described on pages 313-321 of the OpenGL specification, https://www.khronos.org/registry/OpenGL/specs/es/3.2/es_spec_3.2.pdf). In such examples, the sequence of r bits 502 does not specify the recursive sequence taken during the tessellation process but still encodes the sequence of sub-divisions taken during the tessellation process. For example, if a tessellation method first divides a quad domain into rows, then into columns and then sub-divides each quad sub-patch formed by the row-column division into two triangles (e.g. top left and bottom right), then the sequence of r bits 502 may encode, for a particular triangle primitive, the row that it is in, the column that it is in and whether it is a top left or bottom right primitive. A header portion may additionally indicate whether the primitive is an edge primitive (i.e. at the edge of the quad domain) or an interior primitive (i.e. not at the edge of the quad domain). Edge primitives may be encoded as an ordered list by the ID, or may use a portion of the code to indicate which edge of the domain the edge primitive is adjacent to and may use another portion of the code to indicate its position along this edge.

By using a primitive ID that includes a sequence of r bits 502 that specifies the sequence of sub-divisions (e.g. the recursive sequence taken) during the tessellation process (as described above), the primitive ID may be used to efficiently generate vertex data such as UVs for the primitives without the need to completely re-tessellate an entire input or initial patch and so it is not necessary to store all the domain vertex data along with the primitive ID, thereby saving memory.

Figure 7:
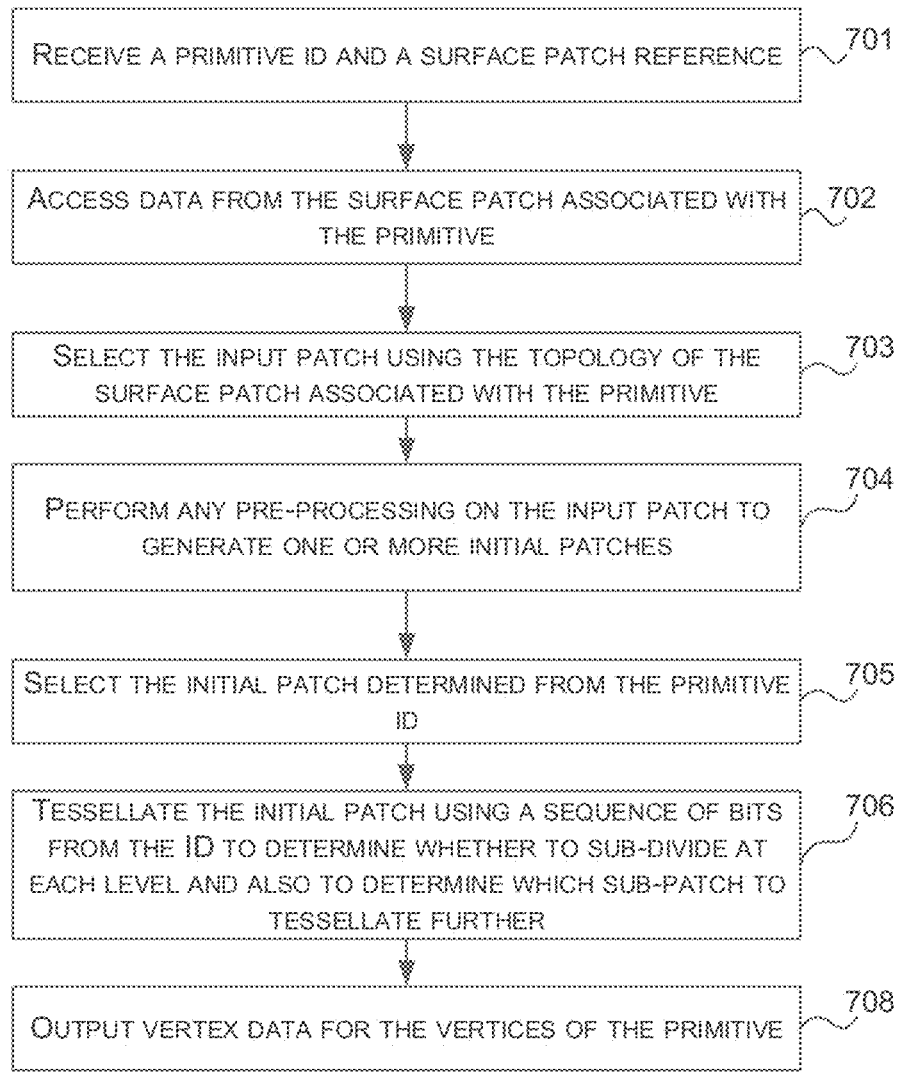
FIGS. 7, 8A and 8B are flow diagrams of example methods of generating vertex data from a primitive ID.

In various examples, the vertex data for a primitive may be generated from the primitive ID by inputting the ID into a simplified version of a tessellation unit (that may be referred to as a Single Primitives Tessellator 114, as shown in FIG. 1B) that executes the tessellation method (e.g. as shown in FIG. 3A, 3B, 4A or 4B) but where the decisions regarding each sub-division branch (e.g. in block 308 of FIGS. 3A and 3B, block 408 of FIGS. 4A and FIG. 4B) are determined using the bits of the ID (e.g. based on the sequence of r bits 502 in the primitive ID), as shown in FIG. 7. The vertex data for a primitive may also be generated from the primitive ID in a similar manner where the tessellation method used is not recursive but is instead an iterative process (as described above).

In such examples, the method (as shown in FIG. 7) comprises: receiving, in a tessellation unit, an ID of a primitive and a surface patch reference (block 701), where this primitive has been previously tessellated (e.g. as described above). The surface patch reference may identify data relating to the surface patch, such as the surface patch control points, tessellation factors and domain topology. A surface patch reference may be stored for each primitive (e.g. stored associated with, or alongside, the primitive ID) or a single patch reference may be stored for multiple primitives formed from the same surface patch (e.g. all primitives from the same patch within the same tile) to save space. The method further comprises: accessing data from the surface patch associated with the primitive using the received surface patch reference (block 702), selecting an input patch using the domain topology for the surface patch associated with the primitive (block 703), performing any necessary pre-processing of that input patch to produce one or more initial patches (block 704) and selecting an initial patch (from those initial patches formed in block 704) based on the primitive ID (block 705). The selection of the initial patch may be performed based on the header portion 504 of the primitive ID (e.g. as shown in FIG. 5A). The method then comprises tessellating the selected initial patch (block 706), wherein at each stage of sub-division, it is determined whether to perform sub-division and which of any newly formed sub-patches to further sub-divide based on a sequence of one or more bits in the primitive ID. The vertex data which is output from the method of FIG. 7 (block 708) comprises a plurality of domain vertices (e.g. two, three or more domain vertices), where, as described above, each domain vertex may comprise only a UV coordinate or may comprise a UV coordinate plus other parameters (e.g. a displacement factor and optionally, parent UV coordinates).

Figure 8A:
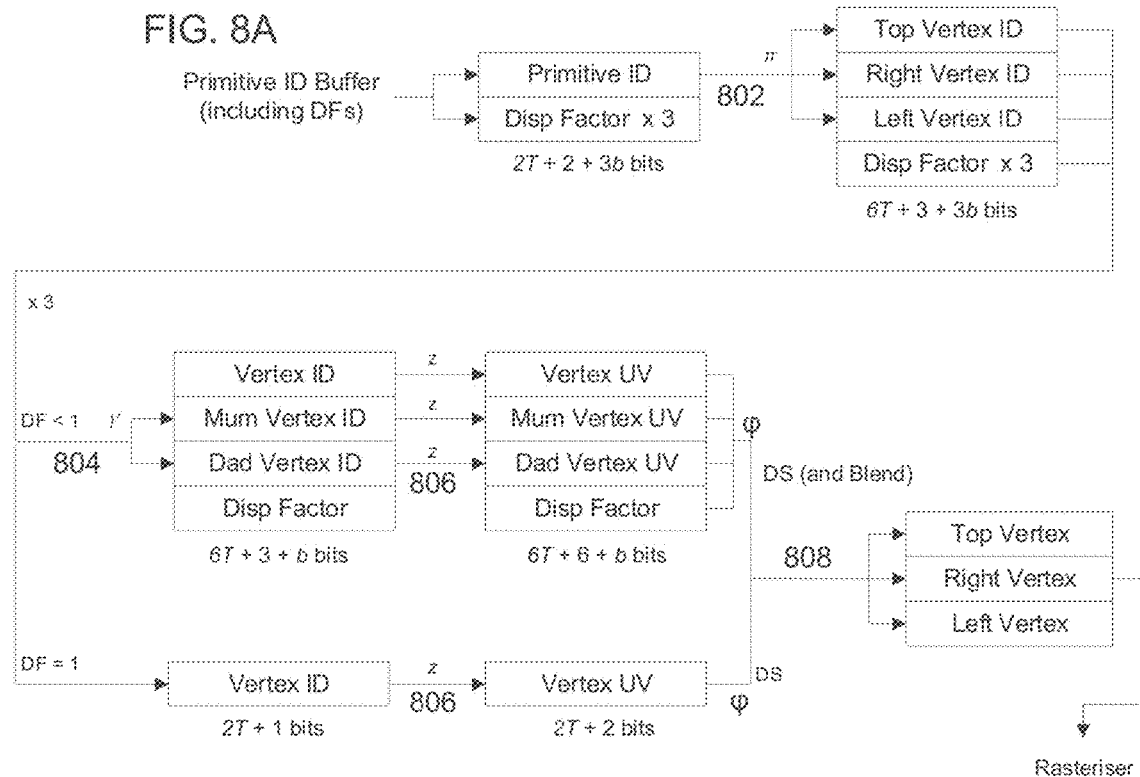
Figure 8B:
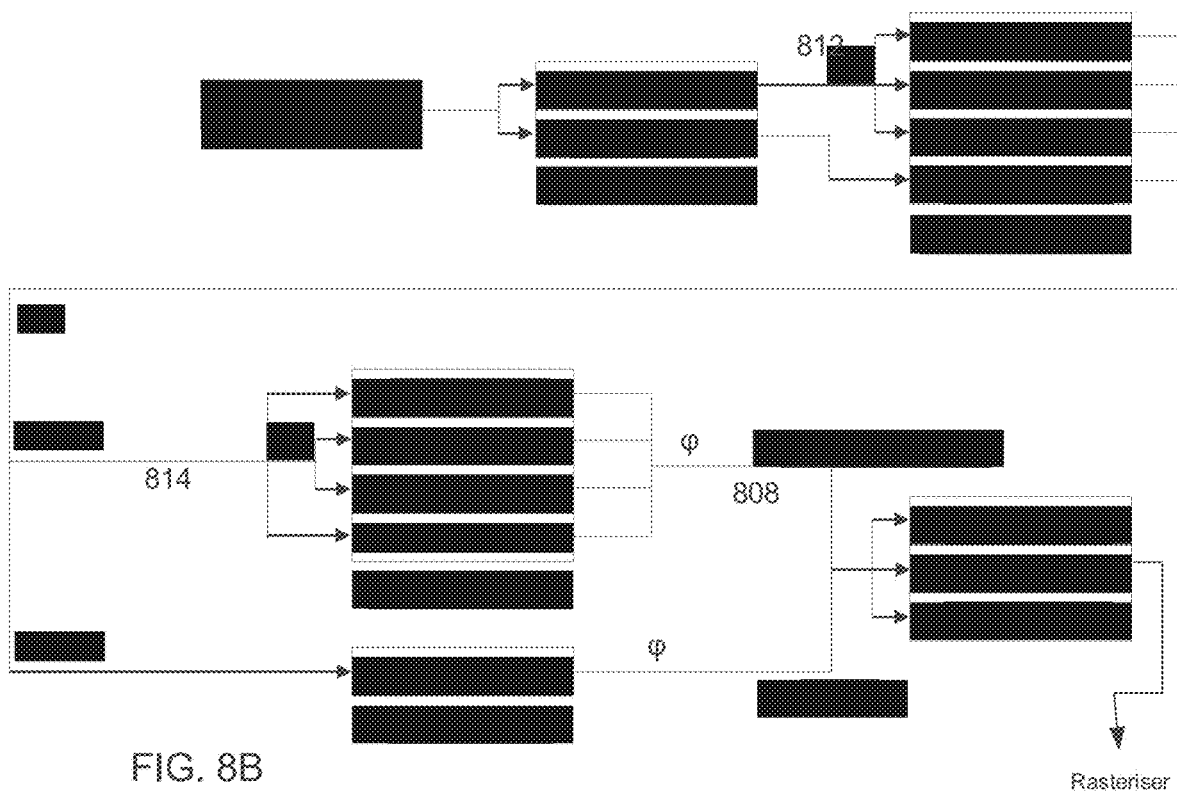

In other examples, however, the vertex data for a primitive may be generated from the primitive ID using an iterative process (irrespective of whether the tessellation process used to generate the primitive ID was iterative or recursive) and two examples are shown in FIGS. 8A and 8B. The methods shown in FIGS. 8A and 8B are described below and implemented in the rasterization phase 111B shown in FIG. 1B. Parts of the method shown may be implemented within a specialized Single Primitives Tessellator 114 (e.g. functions π, γ, z and likewise z' followed by ρ may be implemented in hardware logic within a specialized Single Primitives Tessellator 114) and the final part of the method (e.g. as labelled DS, DS (and Blend) in FIGS. 8A and 8B) may be implemented within the Domain Shader 118.

The primitive IDs described above and generated using the method of FIG. 6 may also be used to provide vertex IDs for each domain vertex. In the subdivision algorithm, every subdivided initial patch, e.g. (T,L,R), creates a new vertex M (e.g. as shown in FIG. 2B) and similarly, every subdivided sub-patch, e.g. (T,L,R), creates a new vertex M. The ID of the primitive given by (T,L,R) may also be assigned to the vertex M. As the primitive ID encodes the sequence of branching to reach the primitive, it also encodes the sequence of branching to reach the vertex M. As subdivision does not occur on the smallest primitives, every vertex ID requires one less bit than the primitive ID, so a single bit saving can be made (i.e. 2T+1 bits for the Quad/Tri domains and T bits for the Isoline domain). These vertex IDs may, for example, be used to regenerate a single vertex at random in a similar way to using a primitive ID to generate the vertex data for the primitive, e.g. by inputting the vertex ID to the tessellation unit (e.g. to the Single Primitives Tessellator 114) and following the same sequence of branches through the tessellator as was originally followed when the vertex was generated; however, the method for generating a primitive from its primitive ID is modified by making one final sub-division of the generated primitive between its left and right vertices (to generate the vertex M) and this is the desired vertex. In examples where more than one new vertex is generated by the sub-division of an initial or sub-patch, then the ID of a newly added vertex M is given by appending one or more bits to the end of the primitive ID given by the patch that was subdivided to generate the vertex M.

This method of encoding vertices as vertex IDs excludes domain vertices not generated by subdivision of an initial or sub-patch, such as the corner vertices and middle vertices 1416, 1418 shown in FIGS. 14A and 14B. However, as the codes 000 . . . 0, 010 . . . 0, 100 . . . 0,110 . . . 0 are unused for the 2D domains and 000 . . . 0 is unused for the Isoline Domain, these may be assigned to the corner vertices in a clockwise fashion and the leftmost vertex, respectively (e.g. to UV coordinates (0,0), (1,0), (1,1) and (0,1)). This leaves the middle vertex for the 2D Domains and the right vertex in the Isoline Domain. For the Quad and Isoline Domains an extra bit is required to allocate a new code. In various examples, the code given by a single 1 followed by (2T+1 or 7) 0 s, denoted by 1000 . . . 0 and 10 . . . 0 respectively, may be used. For the Triangle Domain the code 110 . . . 0 may be used for the middle vertex. These codes make the IDs for the middle vertex of the 2D domains and the ID for the right vertex of the Isoline domain the last vertices when ordering the vertex IDs lexicographically. In general, unused codes can be assigned to the vertices generated by pre-processing of the input patch (as in FIGS. 14A and 14B) rather than sub-division of an initial or sub-patch. This small number of vertex/ID pairs can be treated as special cases when assigning IDs or regenerating domain vertices from IDs. Including these special vertices, an extra bit is required to store every possible code for the Quad and Isoline Domains (i.e. 2T+2 bits for the Quad domain and T+1 bits for the Isoline domain), whereby every code other than the middle vertex of the Quad Domain and the right vertex of the Isoline Domain is preceded by a 0.

The vertex IDs generated in the above fashion are not unique in general. For the Quad/Triangle Domains shown in FIGS. 14A and 14B and subdivision of initial and sub-patches shown in FIGS. 2A-2E, some vertex IDs are not unique: any non-boundary, non-middle vertex is produced twice by the Tessellator, as a subdivided edge is shared by two triangle patches, so there are two possible sequences of branches that reach it and hence such vertices have two different vertex IDs; however, either ID may be used to generate the vertex data. Vertices with two IDs can be split into two types, those in the interior of an initial triangle patch and those on a diagonal between two initial triangle patches.

FIG. 8A shows a flow diagram of a first example method of generating vertex data for a primitive from its primitive ID. As shown in FIG. 8A, the method of generating vertex data for a primitive from its primitive ID also takes as input, up to three displacement factors (DFs), one for each vertex for a triangle patch, where these DFs may, for example, be stored alongside the primitive ID. Although FIG. 8A shows input of 3 DFs, in various examples, fewer than three DFs may be input and the DF for any vertex where a DF is not received may be set equal to one. The use of displacement factors is described in UK Patent Application Number 1509762.9, filed 5 Jun. 2015 and published under publication number GB2539042. As described in that patent application, a displacement factor is a parameter that is used, along with the domain space (UV) coordinates of the vertices in a primitive, to generate one or more world space vertex parameters, such as position, normal and tangent, for each vertex of a primitive. The displacement factor of a vertex can be calculated using the vertex TFs of one or more vertices (e.g. the parent vertices). The displacement factors may be defined such that they have a value between zero and one (i.e. they have a value in [0, 1]) and the value of the displacement factor for a vertex changes dependent upon the "age" of the vertex. In order to avoid visual artifacts (e.g. popping), the displacement factor is zero for a vertex when it is first introduced (e.g. at a particular level of detail) and then the displacement factor increases (as the level of detail increases) and is one before the vertex becomes a parent (as the level of detail increases further). More generally, the displacement factors may use any numerical range, with the value of the displacement factor changing dependent upon the age of the vertex, having one extreme value when the vertex is added and the other extreme value before the vertex becomes a parent.

As shown in FIG. 8A, the vertex data is generated from the primitive ID and three DFs by first generating the IDs of the three vertices (top, right and left) from the primitive ID using a first function, IT (as described below, arrow 802). A second function, y (as described below, arrow 804), is used to generate the two parent Vertex IDs of a vertex and then a third function z (as described below, arrow 806) is used to map a Vertex ID to a vertex UV. The vertices are then submitted (arrow 808) to the domain shader (e.g. domain shader 118 as shown in FIG. 1B) and for the triangle domain, this involves a transformation of the vertices using function φ, as shown in FIG. 9C and described below. For a vertex, if its DF is less than 1, the function γ is applied and then the resulting vertices are shaded in the domain shader and blended (where, for example, the blending step may be an interpolation between two values, the child vertex and the average of the parent vertices, with a weight which is given by the DF). Any vertex with a DF of 1 may skip the use of function γ and may be shaded without blending.

FIG. 8B shows a flow diagram of a second example method of generating vertex data for a primitive from its primitive ID. As shown in FIG. 8B, the method of generating vertex data for a primitive from its primitive ID also takes as input, up to three displacement factors (DFs), including one for each vertex of the input patch with a that is DF is not equal to one, where these DFs may, for example, be stored alongside the primitive ID. As noted above, the use of displacement factors is described in UK Patent Application Publication Number GB2539042.

As shown in FIG. 8B, the vertex data is generated from the primitive ID and up to three DFs by first generating the UVs of the three vertices (top, right and left) from the primitive ID using a first function, z' (as described below, arrow 812). A second function, ρ (as described below, arrow 814), is then used to generate the two parent Vertex UVs of any relevant vertex. The vertices are then submitted (arrow 808) to the domain shader (e.g. domain shader 118 as shown in FIG. 1B) in the same way as the first method shown in FIG. 8A (and again for the triangle domain, this involves a transformation of the vertices using function φ, as shown in FIG. 9C and described below). As described above, if the DF<1, then the function ρ is used and the resulting vertices are shaded in the domain shader and blended (where for example the blending step may be an interpolation between two values, the child vertex and the average of the parent vertices, with a weight which is given by the DF) and any vertex with a DF of 1 may skip the use of p and may be shaded without blending.

It will be appreciated that whilst FIGS. 8A and 8B show the methods for a triangle primitive, the methods may also be used for the isoline domain (e.g. where only two vertices are generated and hence only two input DFs are required). Furthermore, as noted above, whilst three DFs are shown in FIG. 8A, fewer than three DFs may be stored as a space optimization, In an example, only two DFs are stored per primitive (as shown in FIG. 8B) because one of the vertices (e.g. the left or right vertices) is the parent of the top vertex and so has a displacement factor of 1. Which vertex has a DF=1 may be determined either from the vertex IDs (e.g. by looking at the number of trailing zeros: if the top vertex T has a body of t bits, then one of the L and R vertices will have a body of t−1 bits. The parent of T is the other vertex, i.e. the one that does not have the body of t−1 bits) or by storing a flag bit. Similarly, for the isoline domain, only a single DF may be stored, e.g. for the vertex with the smallest number of trailing zeros in its vertex ID, as this will be the child vertex.

FIGS. 8A and 8B show the size of each data structure, where T refers to the maximum TF (as above). The values shown relate to the quad domain. For a triangle domain (irrespective of whether the method of FIG. 8A or the method of FIG. 8B is used), two extra bits are required for each vertex UV. For the isoline domain, only T bits are required for a vertex ID (as described above) and half as many bits for only a vertex U.

Either of the methods of FIGS. 8A and 8B may be used instead of the method of FIG. 7. By using the method of FIG. 8B, instead of the method of FIG. 8A, there are fewer stages and the calculations move out of ID space quicker which may be beneficial in some applications, whereas in the method of FIG. 8A, the calculations are performed in ID space with a later move to UV space and this may result in a more compact solution (e.g. by 1 bit per vertex). The choice between methods may be implementation specific, e.g. because it may depend upon what other processes in the system require the UVs and when these are required.

In the following description of the functions used in the methods of FIGS. 8A and 8B, it is assumed that the tessellation method that results in improved ordering of primitives (as shown in FIGS. 4A and 4B) is used to generate the primitive IDs. If another tessellation method is used, the methods of FIGS. 8A and 8B are still applicable and at a high level, the functions operate in the same or a similar way (e.g. the first and second functions still truncate the primitive ID), however, the exact form of the functions will be different.

The first function, π, in the method of FIG. 8A, is used to generate the IDs of the three vertices (top, right and left) from the primitive ID and this first function involves truncation of the primitive ID in three different places. The first function, π, is composed of two functions: γ' which is an ordered version of the second function γ applied to primitive IDs (described below, and which comprises truncation of a vertex ID in two different places) and τ (which involves a single truncation of a primitive ID). An ordered version of γ is used because a primitive comprises an ordered set of three vertices and so the first function, π, needs to generate the top, right and left vertex IDs in the correct order to avoid generating the primitive with an incorrect orientation. When truncating the primitive ID, truncating n bits off the ID (or part thereof) is equivalent to stepping back n steps up the subdivision hierarchy.

Referring back to FIGS. 2A and 2B, M has the vertex ID equal to the primitive ID of the primitive 202 it subdivides and hence the left and right vertices (L and R) are the parents of M. These can be determined using the function γ' which steps two steps back up the subdivision hierarchy to produce a first parent and another number of steps, S, (S>2) back up the hierarchy to produce a second parent. The value of S is determined by the primitive ID (which is equivalent to the vertex ID of M). This function is described in the table below. The function t generates a vertex ID corresponding to the top vertex of a primitive (T) from a Primitive ID. If a previous subdivision has occurred, the top vertex (T) is the value of M from the previous subdivision and hence its ID can be determined by truncation of the primitive ID. A special case is if the number of subdivision steps r is 0, in which case the primitive is an initial patch and its top vertex has ID 1000 . . . 0. If r>0, the primitive ID is truncated by 1 bit, for example the last bit in the sequence of r bits 502 (e.g. the bit preceding the final 1 in the ID where a tail portion 506 of the form shown in FIG. 5A is used) is removed from that sequence and an additional bit is included in the tail portion 506 (where provided). If using a tail portion 506 of the form shown in FIG. 5A, this therefore comprises setting the bit preceding the final 1 in the ID to a 1 and replacing the final 1 in the ID with a 0.

The second function, y, in the method of FIG. 8A is used to generate the two parent Vertex IDs of a vertex and, as shown in FIG. 8A, is implemented as part of the first function, π, (in its ordered version) and then up to a further three times (e.g. once for each of the top, right and left vertices generated using the first function). As described above, this second function steps two steps back up the subdivision hierarchy to produce a first parent and another number of steps, S, (S>2) back up the hierarchy to produce a second parent, where the value of S is determined by the vertex ID of the current vertex. Given that for vertices with a DF=1, no blending is performed (as described above), the parent vertices are not required and hence the second function, γ, may be omitted for such vertices (as shown in FIG. 8A). This second function, y, (and its ordered version γ̃) therefore comprises truncation of the primitive ID in two different places for all vertices except for the special cases (e.g. those involving the middle or corner vertex) and can be defined as set out in the table shown in FIG. 15 (where rows 1-6 relate to the special cases) which uses the following notation:

| | |
|---|---|
| 1000 . . . 0 | Middle Vertex |
| $a_0 a_1 0 \ldots 0$ | Corner Vertex |
| 10 . . . 0 | Vertex ID tail |
| 0 . . . 0 | Zero or more 0s |
| 1 . . . 1 | Zero of more 1s |
| 0 . . . 1 | The empty string or 01 . . . 1 |
| 1 . . . 0 | The empty string or 10 . . . 0 |

For example, $a_0 a_1$ 011 . . . 110 . . . 0 with parent $a_0 a_1 0$ . . . 110 . . . 0 denotes any of the following child to parent mappings:

| | | |
|---|---|---|
| $a_0 a_1 0110 \ldots 0$ | → | $a_0 a_1 10 \ldots 0$ |
| $a_0 a_1 01110 \ldots 0$ | → | $a_0 a_1 010 \ldots 0$ |
| $a_0 a_1 011110 \ldots 0$ | → | $a_0 a_1 0110 \ldots 0$ |
| $a_0 a_1 0111110 \ldots 0$ | → | $a_0 a_1 01110 \ldots 0$ |

The table of FIG. 15 also has the values $a'_0$, $a'_1$, s, R, L, T, $P_+$, $P_-$, $P_{r-1}$ and $P_{p*}$ defined as follows:

$$2a'_0 + a'_1 \equiv 2a_0 + a_1 + 1 \pmod 4;$$

s is the primitive ID, with the $a_i$ bits corresponding to the header portion 504, the $b_i$ bits corresponding to the sequence of r bits that indicate the recursive sequence 502, and the bits 10 . . . 0 corresponding to the tail portion 506;

R, L, and T refer to the right, left and top vertices of the initial patch that the vertex M is in the domain of, determined by the $a_i$ bits (as used in FIGS. 2A, 9A and 9B), this means that R and L are corner vertices of the domain and T is the middle vertex of the domain;

$P_+$ and $P_-$ are the two parent vertices as shown in FIG. 9A. $P_+$ and $P_-$ correspond to the right and left vertices of the triangle patch 901 that is subdivided by adding vertex M; and $P_{r-1}$ and $P_{p*}$ are the parent vertices two steps up the subdivision hierarchy and the other parent further up the hierarchy (S steps up, where the value of S is encoded in the vertex ID), respectively.

Even though the codomain of γ consists of unordered pairs, the cases with differing order are separated in the table above to highlight that $(P_-, P_+)$ can equal either $(P_{p*}, P_{r-1})$ or $(P_{r-1}, P_{p*})$ and so we can define an ordered version of γ, γ̃. This ordered version of γ, γ̃, may be used to define the first function, π (as described above).

In an example, if T=3 (so 2T+1=7), then for a vertex with an ID 1000101 (=69), this gives:

$$r = 4, r - 1 = 3, b_{r-1} = 0$$
$$p^* = 2, b_{p^*} = 1$$

Hence the parents are as follows:

$$\{P_-, P_+\} = \{P_{p^*}, P_{r-1}\} = \{1001000, 1000100\} = \{72, 68\}$$

The third function, z, in the method of FIG. 8A is used to map a Vertex ID to a vertex UV and, as shown in FIG. 8A, is performed multiple times, e.g. when storing two DFs it may be up to seven times: once for each vertex ID generated using the second function (two sets of three vertices—a child vertex plus two parent vertices) and once for the vertex which has a DF=1 (and for which no parents were generated). However there are at most five unique Vertex IDs produced so fewer runs of the function z can be made by reusing results. The third function, z, produces a vertex UV from a vertex ID by starting with a fixed complex value, forming a sequence of (complex) scaled versions of this value for each bit of the ID and then summing all these values. A final scaling and translation is performed to generate the vertex UV.

For a Quad Domain and a non-corner, non-middle vertex ID given by the code $s = a_0 a_1 b_0 \ldots b_{r-1} 10 \ldots 0$, of 2T+1 bits, the result of the third function (and hence the UV coordinate M of its vertex) is, in complex form:

$$M = z(s) = 2^{T-1}\left((1+i) + i^{2a_0 + a_1 - 1} \cdot w(b_0 \ldots b_{r-1} 10 \ldots 0)\right) \quad (1)$$

$$w(b_0 \ldots b_{r-1} 10 \ldots 0) = \sum_{j=-1}^{r-1} \frac{\mu^{\sum_{k=0}^{j}(-1)^{b_k+k}}}{\sqrt{2}^{j+1}}, \mu = \frac{-1-i}{\sqrt{2}} \quad (2)$$

$z_j$ is defined as the $j^{th}$ term of z, and is given by $$z_j(s) = 2^{T-1} \cdot i^{2a_0 + a_1 - 1} \cdot \frac{\mu^{\sum_{k=0}^{j}(-1)^{b_k+k}}}{\sqrt{2}^{j+1}} \quad (3)$$

For a primitive with ID given by the code $a_0 a_1 b_0 \ldots b_{r-1} 10 \ldots 0$, of 2T+2 bits, the UV coordinates of its vertices T, R and L, as shown in FIG. 9A, are given by:

$$(T, R, L) = (M - z_{r-1}, M - iz_{r-1}, M + iz_{r-1})$$

In the expressions given above:

$2^{T-1}$ is the global scaling to ensure coordinates are Gaussian integers (1+i) is the global translation to centre coordinates around $2^{T-1}(1+i)$ $i^{2a_0 + a_1 - 1}$ is the rotation of an initial triangle patch (−i, 1, i, or −1) encoded in $a_0$ and $a_1$ $$\frac{\mu^{\sum_{k=0}^{j}(-1)^{b_k}+k}}{\sqrt{2}^{j+1}}$$

is the relative position of the $j^{th}$ new vertex from the $(j-1)^{th}$, where $j=-1$ gives the vertex subdividing the initial triangle patch and $j=0, 1, \ldots r-1$ gives the vertex subdividing the sub-patch determined by $b_j$. The magnitude of the relative position of the new vertex from the previous one scales by $\sqrt{2}^{-1}$. The relative direction is:

$$\mu^{\sum_{k=0}^{j}(-1)^{b_k}+k} = \mu^{\sum_{k=0,even}^{j}(-1)^{b_k}+\sum_{k=0,odd}^{j}(-1)^{\overline{b_k}}}$$

$$= \prod_{k=0,even}^{j}\begin{cases}\mu, & b_k = 0 \\ \overline{\mu}, & b_k = 1\end{cases} \prod_{k=0,odd}^{j}\begin{cases}\overline{\mu}, & b_k = 0 \\ \mu, & b_k = 1\end{cases}$$

The bit $b_k$ selects multiplying by either $\mu$ or $\overline{\mu}=\mu^{-1}$, thus reversing the direction and rotating by $2\pi/8$ clockwise or anticlockwise, as shown in FIG. 9B.

For a Triangle Domain the vertex can be generated in the same way as the Quad Domain and then the coordinate can be post transformed into the Triangle Domain by using a transformation function. One example transformation function is the function $\pi$:

$$\varphi: A' \cup B' \cup C' \subseteq \{0, 1, \ldots 2^T\}^2 \to A \cup B \cup C \subseteq \{0, 1, \ldots 3 \cdot 2^T\}^2$$

$$\varphi(u,v) = (u',v') = \begin{cases}(3u-v, 2v) & v \leq \min(u, 2^T - u) & (A') \\ (u-3v+2^{T+1}, u+3v-2^T) & u \geq \max(v, 2^T - v) & (B') \\ (-2v+2^{T+1}, 3u+v-2^T) & v > \max(u, 2^T - u) & (C')\end{cases}$$

Where A, B, C and A', B', C' are three triangle regions in the triangle domain 902 and quad domain 903 respectively, (u,v) is the UV coordinate (where $z(s)=M=u+iv$) and this transformation is shown graphically in FIG. 9C. In other examples, a different transformation function may be used.

For an Isoline Domain and a Vertex ID given by the code $s=b_0 \ldots b_{r-1} 10 \ldots 0$, of T bits, with $b_r=1$, $b_{r+1}=\ldots=b_{T-1}=0$, the coordinate of its vertex M is, considering s as a binary expansion, given by:

$$M = 2^{T-1}\left(1 + \sum_{j=0}^{r-1}\frac{(-1)^{b_j}+1}{2^{j+1}}\right) = 2^T\left(\frac{1}{2^{r+1}} + \sum_{j=0}^{r-1}\frac{b_j}{2^{j+1}}\right) = \sum_{j=0}^{T-1}2^{T-1-j}b_j$$

For a primitive ID given by the code $b_0 \ldots b_{r-1} 10 \ldots 0$, of up to T bits, its vertices L and R are given by:

$$(L, R) = (M - 2^{T-1-r}, M + 2^{T-1-r})$$

The first function, z', in the method of FIG. 8B, is used to generate the UVs of the three vertices (top, right and left) of a primitive from its primitive ID. This function is a modified version of the third function, z, in the method of FIG. 8A (arrow 806) described above. The function, z, as described above, produces a vertex UV from a vertex ID by starting with a fixed complex value, forming a sequence of (complex) scaled versions of this value for each bit of the ID and then summing all these values. In the method of FIG. 8B, the modified version of the function, z', generates three UVs from a single primitive ID and hence includes an additional stage in which the three vertex UVs are generated by translation of a single UV. This can be described with reference to FIG. 9A. The primitive ID corresponds to the ID of the mid vertex, M, and so having generated the vertex UV for M, the UV of the top vertex can be obtained by undoing the last step of the tessellation (translating by $-z_{r-1}$) and then the UVs of the left and right vertices can be obtained by translating by the rotation of $z_{r-1}$ by i and $-i$ respectively.

The function z, or its modified version z', may be generated in a recursive manner. An expression for z is detailed above in equations (1)-(3). z(s) can be computed by first generating $2^{T-1} \cdot w(b_0 \ldots b_{r-1} 10 \ldots 0)$ in a recursive fashion and then calculating:

$$z(s) = 2^{T-1}(1+i) + i^{2a_0+a_1-1} \cdot \left(2^{T-1} \cdot w(b_0 \ldots b_{r-1} 10 \ldots 0)\right)$$

The recursive expression for $2^{T-1} \cdot w(b_0 \ldots b_{r-1} 10 \ldots 0)$ is given as follows, where $(n)_2 = n \pmod 2$:

$$S_{-1} = w_{-1} = 2^{T-1}$$

$$w_j = i^{(b_j+j+1)_2}\left(\frac{-1+i}{2}w_{j-1}\right)$$

$$S_j = S_{j-1} + w_j$$

$$2^{T-1} \cdot w(b_0 \ldots b_{r-1} 10 \ldots 0) = S_{r-1}$$

By multiplying by $2^{T-1}$ it is guaranteed that all $w_j$ and $S_j$ are in the set $\{-2^{T-1}, \ldots, 0, \ldots, 2^{T-1}\}^2$, i.e., Gaussian Integers. The recursive expression can be derived in the following way (using $(-1)^b = 2(b+1)_2 - 1$):

$$2^{T-1} \cdot w(b_0 \ldots b_{r-1} 10 \ldots 0) = 2^{T-1} + 2^{T-1}\sum_{j=0}^{r-1}\frac{\mu^{\sum_{k=0}^{j}2(b_k+k+1)_2-1}}{\sqrt{2}^{j+1}}$$

$$= 2^{T-1} + \sum_{j=0}^{r-1}2^{T-1} \cdot \frac{(\mu^2)^{\sum_{k=0}^{j}(b_k+k+1)_2} \cdot (\mu^{-1})^{j+1}}{\sqrt{2}^{j+1}}$$

$$= 2^{T-1} + \sum_{j=0}^{r-1}2^{T-j-2} \cdot i^{\sum_{k=0}^{j}(b_k+k+1)_2} \cdot$$

$$(-1+i)^{j+1} = 2^{T-1} + \sum_{j=0}^{r-1}w_j$$

Figure 10A:
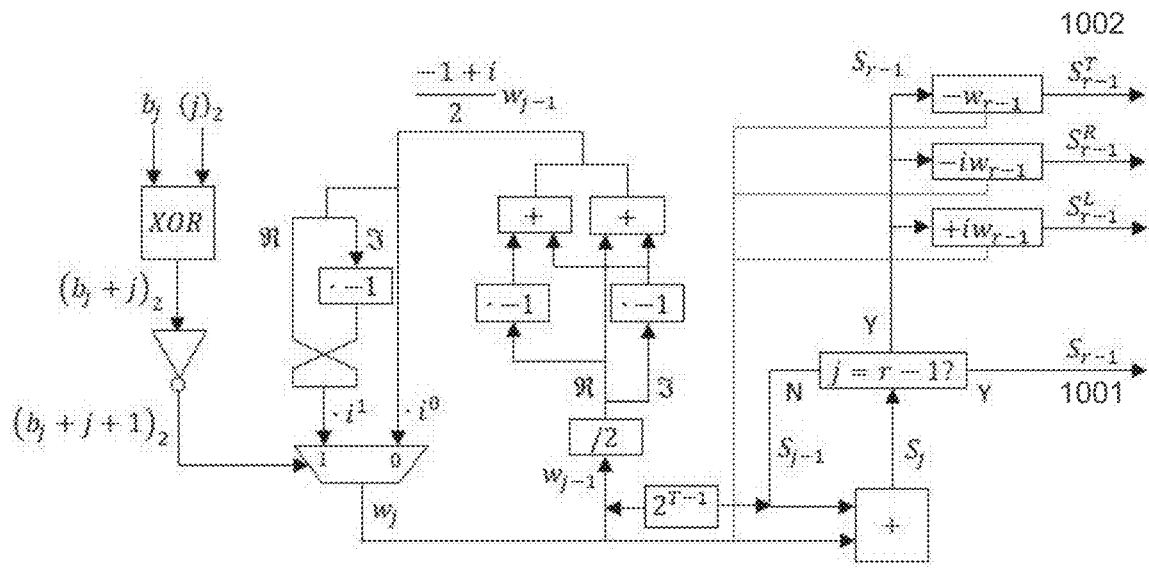
FIGS. 10A and 10B show graphical representations of parts of the method of FIGS. 8A and 8B.

An example iterative implementation of the recursive expression above is shown in FIG. 10A. The single output 1001 is required for the original function, z, and the three outputs 1002 are required for the modified version of the function, z'.

Figure 10B:
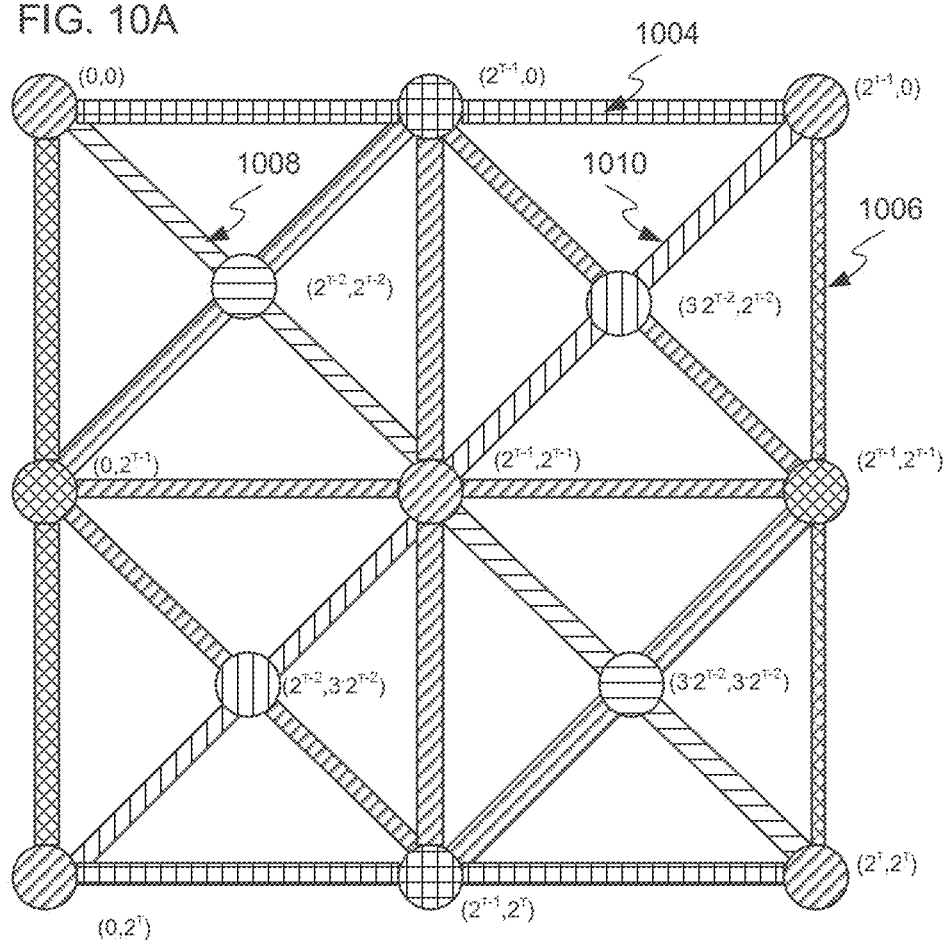

In the method of FIG. 8B, the second function, p, is used to generate the two parent Vertex UVs of a vertex and is performed for each vertex with a DF<1. The equations defining the mapping of this function for the quad domain are shown in the tables below. They are generated based on the following features. Firstly, a child UV is generated precisely two steps of subdivision after one of the parent UVs is generated. Secondly, child vertices bisect an edge in one of four different directions, as can be described with reference to FIG. 10B: if horizontal (shown with squared hatching 1004 in FIG. 10B) only the u coordinate changes; if vertical (shown with the diamond hatching 1006 in FIG. 10B) only the v coordinate changes; if diagonally right-down (shown with the horizontal hatching 1008 in FIG. 10B) the u and v coordinates change in the same magnitude and sign; if diagonally right-up (shown with vertical hatching 1010 in FIG. 10B) the u and v coordinates change in the same magnitude but different sign. Lastly the magnitude of each difference in u or v coordinate is equal to the floor of the UV's level raised to the power two.

The second function, ρ, may also be used in circumstances other than those shown in FIG. 8B. For example, as it provides a way to generate two parent UVs from a child UV, it can be used to reduce the size of an output vertex from the tessellator (and hence the size of any caches used to store them), as these output vertices might otherwise contain a child UV, two or three parent UVs and a DF. Use of this second function enables the parent UVs to be dropped.

Whilst FIG. 8A shows the generation of vertex UVs from primitive IDs, a vertex ID may alternatively be generated from a UV (without re-running the tessellator) and this function, $z^{-1}$, is shown in the tables below. This function may also be used to generate a primitive ID from its UVs without re-running the tessellator (e.g. after the tiling stage) and this may be used to save bandwidth, e.g. because having generated the UV coordinates these may be sent to the tiling unit without the primitive ID, thereby reducing the data transferred between the tessellator and the tiling unit, and the primitive ID may be subsequently regenerated after tiling.

The tables below additionally include a function, $\gamma^{-1}$, that generates a child vertex ID from two parent vertex IDs and this function may be used to determine IDs of children of a given parent vertex from its own ID so that it can be determined when the last child of that parent vertex has been processed so that the parent vertex can be removed from a cache. This improves the efficiency of the cache as vertices can be stored in the cache only as long as they are required.

The following tables show a summary of vertex ID functions for the quad domain:

| Function | γ |
|---|---|
| | γ/~ |
| Domain | S − S* |
| | S S*/~ |
| Codomain | $S^{(2)}$ |
| | $S/\sim^{(2)}$ |
| Mapping | $s = a_0 a_1 b_0 \ldots b_{p*-1} b_{p*} b_{p*+1} \ldots b_{r-1} 10 \ldots 0$ |
| | s. t. $\overline{b_{p*}} = bp*+1 = \ldots = b_{r-1}, r-1 > p* \geq 1 \mapsto$ |
| | $\{a_0 a_1 b_0 \ldots b_{p*-2} 10 \ldots 0, a_0 a_1 b_0 \ldots b_{r-3} 10 \ldots 0\}$ |
| | Other cases are given in the table in FIG. 15 |
| Description | Maps a non-corner, non-middle vertex ID to its (unordered) set of parent IDs |

| Function | ρ |
|---|---|
| Domain | U − U* |
| Codomain | $U^{(2)}$ |
| Mapping | $\rho(u,v) = \begin{cases} \{(u \pm 2^{e_u}, v)\} & e_u < e_v \\ \{(u, v \pm 2^{e_v})\} & e_v < e_u \\ \{(u \pm 2^e, v \pm 2^e)\} & (e = e_u = e_v) \wedge (\overline{b_u \oplus b_v}) \\ \{(u \pm 2^e, v \mp 2^e)\} & (e = e_u = e_v) \wedge (b_u \oplus b_v) \end{cases}$ |
| | $n = 2^{e_n} \cdot m_n$ ($n \in \mathbb{Z}_{\neq 0}$, $e_n \in \mathbb{N}_0$, $m_n \in \mathbb{Z}_{\neq 0}$, $m_n$ odd) |
| | $b_n \in \{0, 1\}$, $2 b_n + 1 \equiv m_n \pmod{4}$ |
| | $(e_0 = T, m_0 = 0)$ |
| Description | Maps a non-corner, non-middle vertex UV to its (unordered) set of parent UV coordinates |

| Function | $z/\sim^{-1}$ |
|---|---|
| Domain | U |
| Codomain | S/~ |
| Mapping | $M \in U, \omega = i^k \left( \dfrac{M}{2^{T-1}} - (1+i) \right) \text{s.t.} \mathcal{R}(\omega) \geq |\mathcal{J}(\omega)|$ |
| | $2\alpha_0 + a_1 \equiv 1 - k \pmod{4}$ |
| | $\omega_0 = \omega - 1, \forall m > 0, \omega_m = (-1 + (-1)^{b_{m-1}+m-1} i) \cdot \omega_{m-1} - 1$ |
| | $b_m \equiv m + \begin{cases} 0 & \mathcal{J}(\omega_m) \leq 0 \\ 1 & \mathcal{J}(\omega_m) > 0 \end{cases}, r = \min\{m \mid \omega_m = 0\}$ |
| Description | Maps a vertex UV coordinate to a representative of its class of Vertex IDs |

| Function | z |
|---|---|
| | z/~ |
| Domain | S |
| Codomain | S/~ |
| Mapping | $s = 000 \ldots 0 \mapsto (0,0)$ |
| | $s = 010 \ldots 0 \mapsto (2^T, 0)$ |
| | $s = 100 \ldots 0 \mapsto (2^T, 2^T)$ |
| | $s = 110 \ldots 0 \mapsto (0, 2^T)$ |
| | $s = 1000 \ldots 0 \mapsto (2^{T-1}, 2^{T-1})$ |

$$s = a_0 a_1 b_0 \ldots b_{r-1} 10 \ldots 0 \mapsto 2^{T-1}\left( (1+i) + i^{2a_0 + a_1 - 1} \sum_{j=-1}^{r-1} \frac{\mu^{\sum_{k=0}^{j}(-1)^{b_k+k}}}{\sqrt{2}^{j+1}} \right)$$

| | |
|---|---|
| Description | Maps a Vertex ID to a vertex UV coordinate |

$$\mu = \frac{-1-i}{\sqrt{2}}$$

| Function | $\gamma/\sim^{-1}$ |
|---|---|
| Domain | $\gamma/\sim(S - S*/\sim)$ |
| Codomain | $S - S*/\sim$ |
| Mapping | $\{\sigma, \varsigma\} = \{a_0a_1b_0 \ldots b_{p^*-2}10 \ldots 0, a_0a_1b_0 \ldots b_{r-3}10 \ldots 0\} \mapsto \begin{cases} a_0a_1b_0 \ldots b_{p^*-2}b_{r-3}b_{r-2}b_{r-1}10 \ldots 0, & p^* = r-2 \\ \overline{b_{r-2}} = b_{r-1} & \\ a_0a_1b_0 \ldots b_{p^*-2}b_{p^*-1}b_{r-3}b_{r-2}b_{r-1}10 \ldots 0, & p^* = r-3 \\ \overline{b_{r-3}} = b_{r-2} = b_{r-1} & \\ a_0a_1b_0 \ldots b_{p^*-2}b_{p^*-1}b_{p^*} \ldots b_{r-3}b_{r-2}b_{r-1}10 \ldots 0, & \text{else} \\ b_{r-3} = b_{r-2} = b_{r-1} & \end{cases}$ |
| Description | Maps a class of (unordered) sets of parent IDs to a representative of its child class of Vertex IDs |

| Function | $\rho^{-1}$ |
|---|---|
| Domain | $\rho(U - U*)$ |
| Codomain | $U - U*$ |
| Mapping | $\{(u_1, v_1), (u_2, v_2)\} \mapsto \left(\frac{u_1 + u_2}{2}, \frac{v_1 + v_2}{2}\right)$ |
| Description | Maps an (unordered) set of parent UV coordinates to a non-corner, non-middle UV |

| Function | $z_j$ |
|---|---|
| Domain | $S - S*$ |
| Codomain | $V$ |
| Mapping | $s = a_0a_1b_0 \ldots b_{r-1}10 \ldots 0 \mapsto 2^{T-1} \cdot i^{2a_0+a_1-1} \cdot \frac{\mu^{\sum_{k=0}^{j}(-1)^{b_k+k}}}{\sqrt{2}^{j+1}}$ |
| Description | $j^{th}$ term of the function $z$, defined for all non-corner and non-middle Vertex IDs |

| Function | $w$ |
|---|---|
| Domain | $B$ |
| Codomain | $W$ |
| Mapping | $s = b_0b_1 \ldots b_{r-1}10 \ldots 0 \mapsto \sum_{j=-1}^{r-1} \frac{\mu^{\sum_{k=0}^{j}(-1)^{b_k+k}}}{\sqrt{2}^{j+1}}$ |
| Description | The subdivision part of $z$, defined for all non-zero binary strings |

In the tables above, the $\sim$ notation is used as follows: given function f from set A to set B, we can define an equivalence relation on A, denoted $\sim$, such that a is equivalent to a', a$\sim$a', if and only if f(a)=f(a'). This is an equivalence relation because a$\sim$a; a$\sim$a' implies a'$\sim$a; and a$\sim$a', a'$\sim$a" implies a$\sim$a". It follows that A can be partitioned into a set of subsets {U} such that for any u in U, v in A then v$\sim$u if and only if v is in U. The set of subsets {U} is denoted A/$\sim$, and it gives an inherited function f/$\sim$ from A/$\sim$ to B given by f/$\sim$(U)=f(u) for any u in U. Moreover, the function is one to one and therefore invertible on its image.

For the triangle domain, the role of code 1000 . . . 0 is swapped with 110 . . . 0 for the middle vertex ID. 110 . . . 0 has three parent IDs 000 . . . 0, 010 . . . 0 and 100 . . . 0 and corresponds to the vertex coordinate $(2^{T-1}, 2^{T-1})$ with parent coordinates (0,0), $(3 \cdot 2^T, 0)$ and $(0, 3 \cdot 2^T)$. Any function with a domain contained in U or $U^{(2)}$ is pre-composed with $\varphi^{-1}$ or $\{\varphi^{-1}, \varphi^{-1}\}$ respectively to pre-map Triangle Domain UVs into Quad Domain UVs (e.g. as shown in FIG. 9C).

Any function with a codomain contained in U or $U^{(2)}$, is post-composed with $\varphi$ or $\{\varphi, \varphi\}$ respectively to post-map Quad Domain UVs into Triangle Domain UVs. There is also the alternative congruence $2a'_0+a'_1 \equiv 2a_0+a_1+1 \pmod{3}$ for TR or TL boundary vertices for the other cases shown in the table of FIG. 15.

The following tables show a summary of vertex ID functions for the isoline domain. As the Vertex ID of a U coordinate is simply its binary expansion and as the U coordinate would generally be stored in binary form, they can be considered equivalent. A notable part of the following table is in parent calculation, which is given by adding and subtracting the largest power of 2 dividing the U coordinate (with an equivalent expression for the Vertex ID that involves truncating the code to two different lengths).

| Function | $z$ |
|---|---|
| Domain | $S$ |
| Codomain | $U$ |
| Mapping | $s = 0 \ldots 0 \mapsto 0$ |
| | $s = 10 \ldots 0 \mapsto 2^T$ |
| | $s = b_0b_1 \ldots b_{r-1}10 \ldots 0 \mapsto \sum_{j=0}^{T-1} 2^{T-1-j}b_j$ |
| | $b_r = 1, b_{r+1} = \cdots = b_{T-1} = 0$ |
| Description | Maps a Vertex ID to a vertex UV coordinate |

| Function | $\gamma$ |
|---|---|
| Domain | $S - S*$ |
| Codomain | $S^{(2)}$ |
| Mapping | $s = b_0 \ldots b_{p^*-1}b_{p^*}b_{p^*+1} \ldots b_{r-1}10 \ldots 0$ |
| | s. t. $\overline{b_{p^*}} = bp^*+1 = \cdots = b_{r-1}, r - 1 > p^* \geq 0 \mapsto$ |
| | $\{a_0a_1b_0 \ldots b_{p^*-1}10 \ldots 0, a_0a_1b_0 \ldots b_{r-2}10 \ldots 0\}$ |
| | $s = 10 \ldots 0 \mapsto \{0 \ldots 0, 100 \ldots 0\}$ |
| | $s = 00 \ldots 010 \ldots 0 \mapsto \{0 \ldots 0, 0 \ldots 010 \ldots 0\}$ |
| | $s = 11 \ldots 110 \ldots 0 \mapsto \{1 \ldots 110 \ldots 0, 100 \ldots 0\}$ |
| Description | Maps a non-corner, non-middle vertex ID to its (unordered) set of parent IDs |

| Function | $\rho$ |
|---|---|
| Domain | $U - U*$ |
| Codomain | $U^{(2)}$ |
| Mapping | $\rho(u) = \{u - 2^{e_u}, u + 2^{e_u}\}$ |
| | $n = 2^{e_n} \cdot m_n$ ($n \in \mathbb{Z}_{\neq 0}, e_n \in \mathbb{N}, m_n \in \mathbb{Z}_{\neq 0}, m_n$ odd) |
| | $(e_0 = T, m_0 = 0)$ |
| Description | Maps a non-corner, non-middle vertex UV to its (unordered) set of parent UV coordinates |

| Function | $z^{-1}$ |
|---|---|
| Domain | U |
| Codomain | s |
| Mapping | $M = \sum_{j=0}^{T-1} 2^{T-1-j} b_j \mapsto b_0 b_1 \ldots b_{T-1}$ |
| Description | Maps a vertex UV coordinate to its Vertex ID |

| Function | $\gamma^{-1}$ |
|---|---|
| Domain | $\gamma(S - S^*)$ |
| Codomain | $S - S^*$ |
| Mapping | $\{\sigma, \varsigma\} = \{a_0 a_1 b_0 \ldots b_{p^*-1} 10 \ldots 0, a_0 a_1 b_0 \ldots b_{r-2} 10 \ldots 0\} \mapsto \begin{cases} a_0 a_1 b_0 \ldots b_{p^*-1} b_{r-2} b_{r-1} 10 \ldots 0, \overline{b_{r-2}} = b_{r-1} & p^* = r - 2 \\ a_0 a_1 b_0 \ldots b_{p^*-2} b_{p^*-1} b_{p^*} \ldots b_{r-2} b_{r-1} 10 \ldots 0, b_{r-2} = b_{r-1} & \text{else} \end{cases}$ |
| | (other cases determined from $\gamma$) |
| Description | Maps an (unordered) set of parent Vertex IDs to a non-corner, non-middle Vertex ID |

| Function | $\rho^{-1}$ |
|---|---|
| Domain | $\rho(U - U^*)$ |
| Codomain | $U - U^*$ |
| Mapping | $\{u_1, u_2\} \mapsto \dfrac{u_1 + u_2}{2}$ |
| Description | Maps an (unordered) set of parent UV coordinates to a non-corner, non-middle UV |

As described above, the three functions used in the method of FIG. 8A are described in relation to the tessellation method that results in improved ordering of primitives (as shown in FIG. 4A). If another tessellation method is used, the method of FIG. 8A is still applicable and at a high level, the functions operate in the same or a similar way but the functions themselves are different. For example, if improved ordering is not used, the modified ID of each vertex may be given by complementing every odd $b_x$. The new versions of the three functions in FIG. 8A may then be found by conjugating by this complementation. For example, to find a parent ID, the method may comprise: complementing every odd $b_x$, truncating the ID to $p^*$ or $r-1$, and then complementing every odd $b_x$ in the truncated code.

Using the methods described above for primitive ID and vertex ID generation, the IDs are a string of bits that include a portion that comprises r bits, each of the r bits indicating one of two possible branches in the tessellator (e.g. patch selected or not selected) and hence the IDs encode tessellator branching. These IDs can be used by the tessellation unit to reproduce the full vertex and/or the full primitive (as described above). As described above, vertex and primitive IDs on the boundary of the domain take a different form to those on the interior of the domain and hence it can be determined from the ID alone whether a vertex/primitive is on the boundary or in the interior.

As described above, a vertex ID encodes UV coordinates because it can be used to generate a single UV coordinate and a primitive ID can be used to generate three UV coordinates for the quad/triangle domain or two UV coordinates for the isoline domain. A primitive ID, as described above, encodes its vertex IDs and these can be determined by truncation of the IDs as described above. The IDs also encode order as primitives output by the Tessellator in order have Primitive IDs in order when sorted lexicographically (denoted ID order). For a given vertex, its parents' IDs are generally nearby in the ID order, and as nearby IDs are also very similar, this enables good compression of blocks of IDs when stored in memory. Additionally, as described above, the IDs can be compact, i.e. they can have a form that comprises the minimal number of bits required to represent all primitives and vertices (e.g. where T is equal to the maximum TF).

In contrast to storing UVs, the IDs can be used to regenerate other tessellator vertex attributes using a Single Primitive Tessellator. If instead just UVs were stored, these do not encode order and cannot be used to regenerate other tessellator vertex attributes such as displacement factors.

The methods described herein are applicable to all input domains of tessellation: quad, triangle, isoline and general polygons.

There are many applications for the primitive IDs and vertex IDs as described below and some of these have been described above. Example applications include:

Generating Vertices for the Domain Shader/Blender—A random Vertex or Primitive ID can be fed into a Single Primitive Tessellator to generate one or three/two vertices respectively with attributes such as UVs and DFs.

Generating UV coordinates—A hardware unit may be used to generate a UV coordinate for a random Vertex ID, or three/two UV coordinates for a random Primitive ID.

Searching the Tessellator Output Primitives—As the Tessellator outputs primitives in the order given by the IDs ordered lexicographically, they are ready sorted for searching.

Addressing a Cache—Vertices or Primitives can be cached and addressed by their respective IDs. The ID order ensures good cache coherency especially when searching for recently used parents as they are close in the ID ordering and so are more likely to belong to the cache.

Searching for Parents—Vertex IDs can be used to generate parent Vertex IDs, which in turn can be used to search for parent vertices in a vertex cache.

Searching for Primitive Vertices—Primitive IDs can be used to generate their three/two Vertex IDs, which in turn can be used to search for their vertices in a vertex cache.

The methods of generating and using primitive IDs and vertex IDs are described above in combination with a graphics processing system which uses tile-based deferred rendering (TBDR). The methods may, however, also be used in graphics processing systems which use techniques to reduce the amount of memory stored in the parameter memory (e.g. parameter memory 107, 117 shown in FIGS. 1A and 1B). One such technique is described in UK Patent Application Publication No. GB2458488. Typically display lists include, for each specific tile, indications of which transformed primitives are needed to render the specific tile (where a transformed primitive is one that is transformed into screen space). The transformed primitives are stored in a parameter memory, along with the display lists. By using untransformed primitives instead, the need to store transformed primitives in the parameter memory is avoided and instead each display list includes indications of the untransformed primitives that are needed to render the specific tile. In the rasterization phase, the primitives are re-transformed using the untransformed primitive data which is stored in graphics memory, which requires additional processing (compared to reading the transformed primitive data from the parameter memory) but with the benefit of reducing the amount of data stored in the parameter memory. Where this technique is used in combination with the methods described herein, a display list comprises a list of IDs generated as described above and at least one reference to a patch for all the primitives in the tile that are generated from that patch. In such an example, the Single Primitives Tessellator 114 (in FIG. 1B) would be one stage in a chain of primitive generation stages. This has the effect that the processing in the rasterization phase is reduced because the primitive ID simplifies the tessellation process by encoding the tessellation sequence to be followed.

Figure 11:
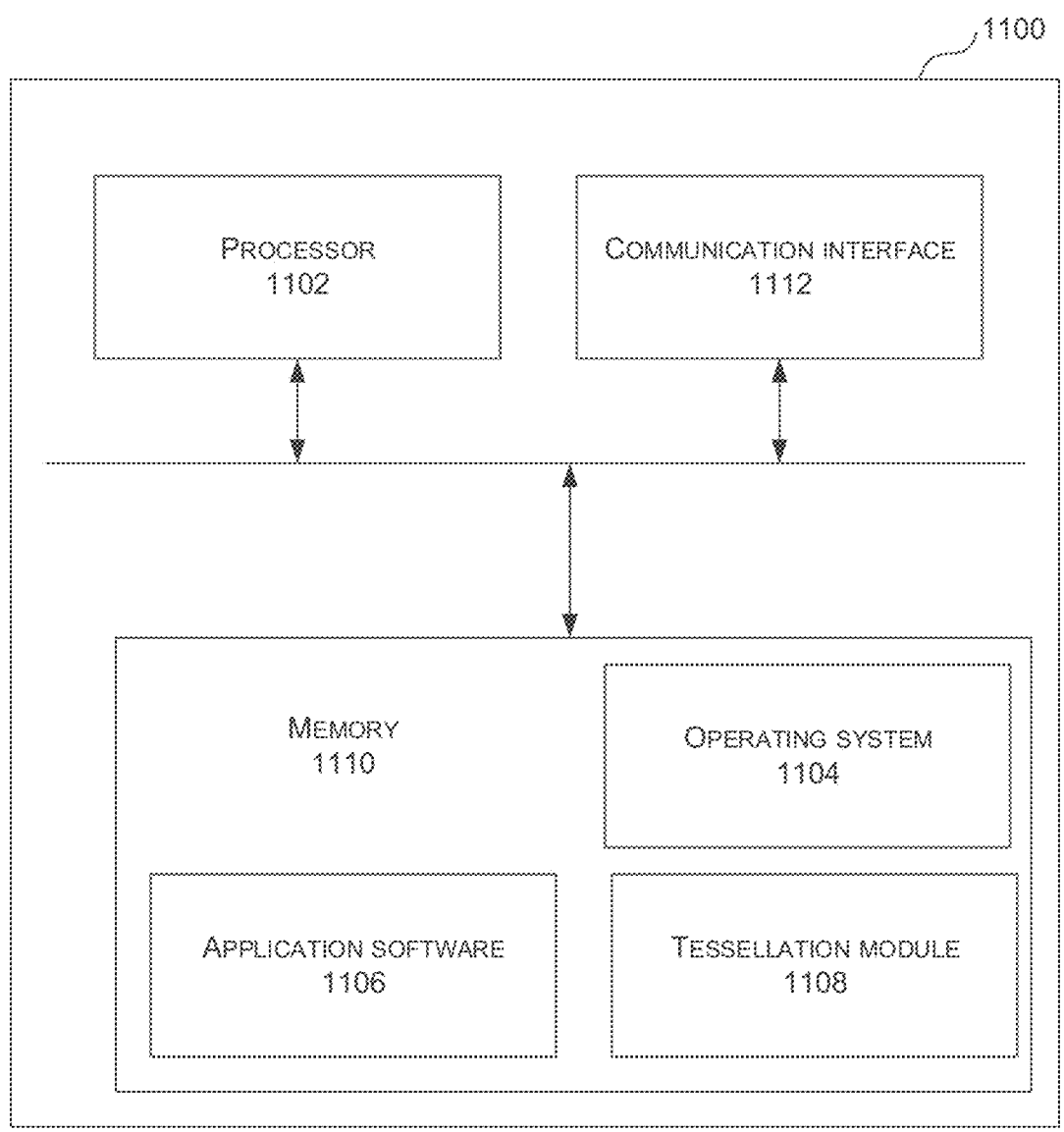
FIG. 11 is a schematic diagram of a computing-based device configured to implement the methods of generating and/or using primitive and/or vertex IDs described herein.

The methods described herein may be implemented in a hardware tessellation unit 111 (as shown in FIG. 1B) or in a separate Single Primitives Tessellator 114. Alternatively, the methods may be implemented in software (or a combination of software and hardware). FIG. 11 illustrates various components of an exemplary computing-based device 1100 which may be implemented as any form of a computing and/or electronic device, and which may be configured to implement the methods described above.

A first further example provides a method of performing tessellation in a computer graphics system, the method comprising: sub-dividing an initial patch into a plurality of primitives using a plurality of sub-division steps; and generating a primitive ID for each primitive, wherein the primitive ID encodes data about how the primitive was generated by the plurality of sub-division steps.

The data about how the primitive was generated by sub-dividing the initial patch may comprise a sequence of bits describing the plurality of sub-division steps taken to generate the primitive during tessellation. Each bit in the sequence of bits may indicate which branch was taken at a respective sub-division step to generate the primitive during tessellation.

The ID of a primitive may comprise a sequence of bits that specifies a recursive sequence taken during the tessellation process. The ID of a patch may further comprise a variable length tail portion and wherein the ID of a patch comprises a fixed number of bits.

Sub-dividing an initial patch into a plurality of primitives using a plurality of sub-division steps may comprise: analysing an initial patch to determine whether to sub-divide the patch; in response to determining that the patch is not to be sub-divided, outputting the patch as a triangle primitive; in response to determining that the patch is to be sub-divided, dividing the initial patch into two or more sub-patches; selecting each sub-patch formed by sub-division of the initial patch in turn and repeating the method with the selected sub-patch in place of the initial patch; and wherein generating an ID for each primitive may comprise: in response to dividing the initial patch into two or more sub-patches, assigning the sub-patches an ID that matches an ID of the patch that has been sub-divided; and in response to selecting a patch formed by sub-division of the initial patch, updating IDs of each patch formed by sub-division of the initial patch dependent upon the selection.

The initial patch may be formed by sub-division of a triangle, quad or polygonal domain and the ID of a patch further comprises a header portion comprising one or more bits indicating which of a plurality of initial patches formed from the triangle or quad domain the primitive is in.

Updating IDs of each patch formed by sub-division of the initial patch dependent upon the selection may comprise, for each ID: adding one or more new bits to the sequence of bits that specifies a recursive sequence taken during the tessellation process, a value of the new bits being dependent upon the selection.

The initial patch may be a triangle patch and selecting each sub-patch formed by sub-division of the initial patch in turn and repeating the method with the selected sub-patch in place of the initial patch may comprise: selecting each of the sub-patches formed by sub-division of the initial patch in turn based on values of one or more flags and repeating the method with the selected sub-patch in place of the initial patch; and wherein repeating the method with the selected sub-patch in place of the initial patch comprises: analysing the selected sub-patch to determine whether to further sub-divide the selected sub-patch; in response to determining that the selected sub-patch is not to be sub-divided, outputting the selected sub-patch as a triangle primitive; in response to determining that the selected sub-patch is to be further sub-divided, dividing the selected sub-patch into two or more sub-patches; and selecting each sub-patch formed by sub-division of the selected sub-patch in turn based on values of one or more flags and repeating the method with the selected sub-patch.

Dividing the initial patch into two or more sub-patches may comprise: dividing the initial patch into a left sub-patch and a right sub-patch.

In the method, the initial patch may have an ordering flag, sub-division forms two patches, a left patch and a right patch, and selecting each of the left and right patches formed by sub-division of the initial patch in turn based on values of one or more flags may comprise: selecting each of the left and right patches formed by sub-division of the initial patch in turn based on a value of the ordering flag of the initial patch.

In the method, sub-division forms two patches, a left patch and a right patch and selecting each of the left and right patches formed by sub-division of the initial patch in turn based on values of one or more flags may comprise: selecting each of the left and right patches formed by sub-division of the initial patch in turn based on a value of an ordering flag.

The method may further comprise: inverting the value of the ordering flag once for each increase or decrease in a level of sub-division.

The initial patch may comprise two or three vertices and dividing the initial patch into two or more sub-patches may comprise: adding a new vertex (M); assigning the new vertex an ID of the initial patch that has been sub-divided; forming a left sub-patch comprising the new vertex and one or two of the vertices of the initial patch; and forming a right sub-patch comprising the new vertex and one or two of the vertices of the initial patch.

The method may further comprise: receiving, in a tessellation unit, an ID of a previously tessellated primitive and a surface patch reference; accessing data from the surface patch associated with the primitive, the data comprising tessellation factors and topology data; selecting an initial patch based on the primitive ID, and at least partially tessellating the initial patch with one or more sub-division stages, wherein at each stage of sub-division, it is determined whether to perform sub-division and which of any newly formed sub-patches to further sub-divide based on a sequence of one or more bits in the ID of the primitive.

The method may further comprise: receiving, in a tessellation unit, an ID of a primitive; truncating the ID of the primitive in a plurality of different places to generate IDs of each vertex in the primitive; for a sub-set of the vertices in the primitive, truncating the ID of the vertex ID of the vertex in a plurality of different places to generate IDs of parent vertices; using the vertex IDs to calculate UV coordinates for each vertex in the primitive and the parent vertices for the sub-set of the vertices in the primitive; and generating, using a Domain Shader, vertex data for each vertex in the primitive from the calculated UV coordinates.

A second further example provides a method of performing tessellation in a computer graphics system, the method comprising: receiving, in a tessellation unit, an ID of a previously tessellated primitive and a surface patch reference; accessing data from the surface patch associated with the primitive, the data comprising tessellation factors and topology data; selecting an initial patch based on the primitive ID, and at least partially tessellating the initial patch with one or more sub-division stages, wherein at each stage of sub-division, it is determined whether to perform sub-division and which of any newly formed sub-patches to further sub-divide based on a sequence of one or more bits in the ID of the primitive.

The method may further comprise: selecting an input patch based on the data from the surface patch associated with the primitive and subdividing the input patch into one or more initial patches.

The ID of the primitive or of a patch may comprise a sequence of bits that specifies a recursive sequence taken during the tessellation process. Each bit in the sequence of bits may indicate whether to process a left sub-patch or a right sub-patch formed by a sub-division operation in the tessellation process.

The method may further comprise: accessing the ID of the previously tessellated primitive from memory.

In the method, at least partially tessellating the initial patch generated from subdivision of an input patch may result in re-generating the previously tessellated primitive.

The method may further comprise: outputting domain vertices for the previously tessellated primitive. The domain vertices may be output to a domain shader. Where the previously tessellated primitive is a triangle primitive, three domain vertices are output. Where the previously tessellated primitive is an isoline primitive, two domain vertices are output.

A third further example provides a method of performing tessellation in a computer graphics system, the method comprising: receiving, in a tessellation unit, an ID of a primitive; truncating the ID of the primitive in a plurality of different places to generate IDs of each vertex in the primitive; for a sub-set of the vertices in the primitive, truncating the ID of the vertex ID of the vertex in a plurality of different places to generate IDs of parent vertices; using the vertex IDs to calculate UV coordinates for each vertex in the primitive and the parent vertices for the sub-set of the vertices in the primitive; and generating, using a Domain Shader, vertex data for each vertex in the primitive from the calculated UV coordinates.

The ID of a primitive may comprise a sequence of bits describing the sub-division sequence used to generate the primitive.

The ID of a primitive may comprise a sequence of bits that specifies a recursive sequence taken during the tessellation process. The recursive sequence may define a subdivision hierarchy and truncating the ID of the primitive in a plurality of different places to generate IDs of each vertex in the primitive may comprise: performing a first truncation according to a first function that steps one step back up the subdivision hierarchy to generate a first vertex ID; performing two further truncations according to a second function to generate second and third vertex IDs, wherein the second function steps two steps back up the subdivision hierarchy to generate the second vertex ID and steps S steps back up the subdivision hierarchy to generate the third vertex ID, wherein a value of S is determined by the ID of the primitive. Each vertex may have an associated displacement factor and the sub-set may comprise only those vertices in the primitive with a displacement factor that is not equal to a maximum value of displacement factor.

The recursive sequence may define a subdivision hierarchy and for the sub-set of the vertices in the primitive, truncating the vertex ID of the vertex in a plurality of different places to generate IDs of parent vertices, may comprise: for the sub-set of the vertices in the primitive, performing two truncations according to the second function to generate a first parent vertex ID and a second parent vertex ID, wherein the second function steps two steps back up the subdivision hierarchy to generate the first parent vertex ID and steps S steps back up the subdivision hierarchy to generate the second parent vertex ID, wherein a value of S is determined by the vertex ID.

The recursive sequence may define a subdivision hierarchy and using the vertex IDs to calculate UV coordinates for each vertex in the primitive and the parent vertices for the sub-set of vertices in the primitive, may comprise: for each vertex in the primitive: using a third function to calculate a vertex UV coordinate for the vertex from the vertex ID; and for the sub-set of the vertices in the primitive: using the third function to calculate vertex UV coordinates for the parent vertices of the vertex from the vertex IDs of the parent vertices. The third function may comprise: generating a fixed complex value; forming a sequence of scaled versions of the complex value for each bit of a vertex ID; summing all the scaled versions in the sequence; and performing a scaling and translation operation to generate the vertex UV corresponding to the vertex ID.

A fourth further example provides a tessellation unit configured to perform tessellation in a computer graphics system, the tessellation unit comprising hardware logic arranged to: sub-divide an initial patch into a plurality of primitives using a plurality of sub-division steps; and generate a primitive ID for each primitive, wherein the primitive ID encodes data about how the primitive was generated by the plurality of sub-division steps.

The hardware logic arranged to divide the initial patch into two or more sub-patches may comprise hardware logic arranged to: divide the initial patch into a left sub-patch and a right sub-patch.

In various examples, the initial patch has an ordering flag, sub-division forms two patches, a left patch and a right patch, and the hardware logic arranged to select each of the left and right patches formed by sub-division of the initial patch in turn based on values of one or more flags comprises hardware logic arranged to: select each of the left and right patches formed by sub-division of the initial patch in turn based on a value of the ordering flag of the initial patch.

The sub-division may form two patches, a left patch and a right patch and the hardware logic arranged to select each of the left and right patches formed by sub-division of the initial patch in turn based on values of one or more flags may comprise hardware logic arranged to: select each of the left and right patches formed by sub-division of the initial patch in turn based on a value of an ordering flag.

The tessellation unit may further comprise hardware logic arranged to: invert the value of the ordering flag once for each increase or decrease in a level of sub-division.

In various examples, the initial patch comprises two or three vertices and the hardware logic arranged to divide the initial patch into two or more sub-patches may comprise hardware logic arranged to: add a new vertex (M); assign the new vertex an ID of the initial patch that has been sub-divided; form a left sub-patch comprising the new vertex and one or two of the vertices of the initial patch; and form a right sub-patch comprising the new vertex and one or two of the vertices of the initial patch.

A fifth further example provides a computer graphics system comprising: a first tessellation unit as described herein; and a second tessellation unit comprising hardware logic arranged to: receive, in a tessellation unit, an ID of a previously tessellated primitive and a surface patch reference; access data from the surface patch associated with the primitive, the data comprising tessellation factors and topology data; select an input patch based on the data from the surface patch associated with the primitive and subdivide the input patch into one or more initial patches; select an initial patch based on the primitive ID, and at least partially tessellate the initial patch with one or more sub-division stages, wherein at each stage of sub-division, it is determined whether to perform sub-division and which of any newly formed sub-patches to further sub-divide based on a sequence of one or more bits in the ID of the primitive.

The tessellation unit may further comprise hardware logic arranged to: output domain vertices for the previously tessellated primitive. The domain vertices may be output to a domain shader (118).

The tessellation unit may further comprise hardware logic arranged to: access the ID of the previously tessellated primitive from memory.

A sixth further example provides a computer graphics system comprising: a first tessellation unit as described herein; a second tessellation unit comprising hardware logic arranged to: receive, in a tessellation unit, an ID of a primitive; truncate the ID of the primitive in a plurality of different places to generate IDs of each vertex in the primitive; for a sub-set of the vertices in the primitive, truncate the ID of the vertex ID of the vertex in a plurality of different places to generate IDs of parent vertices; and use the vertex IDs to calculate UV coordinates for each vertex in the primitive and the parent vertices for the sub-set of the vertices in the primitive; and a domain shader comprising hardware logic arranged to generate vertex data for each vertex in the primitive from the calculated UV coordinates.

The ID of a primitive may comprise a sequence of bits that specifies a recursive sequence taken during the tessellation process.

In various examples, each vertex has an associated displacement factor and the sub-set comprises only those vertices in the primitive with a displacement factor that is not equal to a maximum value of displacement factor.

In various examples in which the ID of a primitive comprises a sequence of bits that specifies a recursive sequence taken during the tessellation process, the recursive sequence may define a subdivision hierarchy and the hardware logic in the tessellation unit arranged to use the vertex IDs to calculate UV coordinates for each vertex in the primitive and the parent vertices for the sub-set of vertices in the primitive, may comprise hardware logic arranged: for each vertex in the primitive: to use a third function to calculate a vertex UV coordinate for the vertex from the vertex ID; and for the sub-set of the vertices in the primitive: to use the third function to calculate vertex UV coordinates for the parent vertices of the vertex from the vertex IDs of the parent vertices. The third function may comprise: generating a fixed complex value; forming a sequence of scaled versions of the complex value for each bit of a vertex ID; summing all the scaled versions in the sequence; and performing a scaling and translation operation to generate the vertex UV corresponding to the vertex ID.

A seventh further example provides a tessellation unit configured to perform tessellation in a computer graphics system, the tessellation unit comprising hardware logic arranged to: receive, in a tessellation unit, an ID of a previously tessellated primitive and a surface patch reference; access data from the surface patch associated with the primitive, the data comprising tessellation factors and topology data; select an initial patch based on the primitive ID, and at least partially tessellate the initial patch with one or more sub-division stages, wherein at each stage of sub-division, it is determined whether to perform sub-division and which of any newly formed sub-patches to further sub-divide based on a sequence of one or more bits in the ID of the primitive.

An eighth further example provides a computer graphics system comprising: a tessellation unit comprising hardware logic arranged to: receive, in a tessellation unit, an ID of a primitive; truncate the ID of the primitive in a plurality of different places to generate IDs of each vertex in the primitive; for a sub-set of the vertices in the primitive, truncate the ID of the vertex ID of the vertex in a plurality of different places to generate IDs of parent vertices; and use the vertex IDs to calculate UV coordinates for each vertex in the primitive and the parent vertices for the sub-set of the vertices in the primitive; and a Domain Shader comprising hardware logic arranged to generate vertex data for each vertex in the primitive from the calculated UV coordinates.

Computing-based device 1100 comprises one or more processors 1102 which may be microprocessors, controllers or any other suitable type of processors for processing computer executable instructions to control the operation of the device in order to perform the primitive and optionally vertex ordering methods described herein. In some examples, for example where a system on a chip architecture is used, the processors 1102 may include one or more fixed function blocks (also referred to as accelerators) which implement a part of an ordering method in hardware (rather than software or firmware). Platform software comprising an operating system 1104 or any other suitable platform software may be provided at the computing-based device to enable application software 1106 to be executed on the device and the application software may include a tessellation module 1108 that is configured to implement one or more of the methods described herein.

The computer executable instructions may be provided using any computer-readable media that is accessible by computing based device 1100. Computer-readable media may include, for example, computer storage media such as memory 1110 and communications media. Computer storage media (i.e. non-transitory machine readable media), such as memory 1110, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1110) is shown within the computing-based device 1100 it will be appreciated that the storage may be distributed or located remotely and accessed via a network or other communication link (e.g. using communication interface 1112).

The computing-based device 1100 may also comprise an input/output controller arranged to output display information to a display device which may be separate from or integral to the computing-based device 1100. The display information may provide a graphical user interface. The input/output controller may also be arranged to receive and process input from one or more devices, such as a user input device (e.g. a mouse or a keyboard). In an embodiment the display device may also act as the user input device if it is a touch sensitive display device. The input/output controller may also output data to devices other than the display device, e.g. a locally connected printing device.

Figure 12:
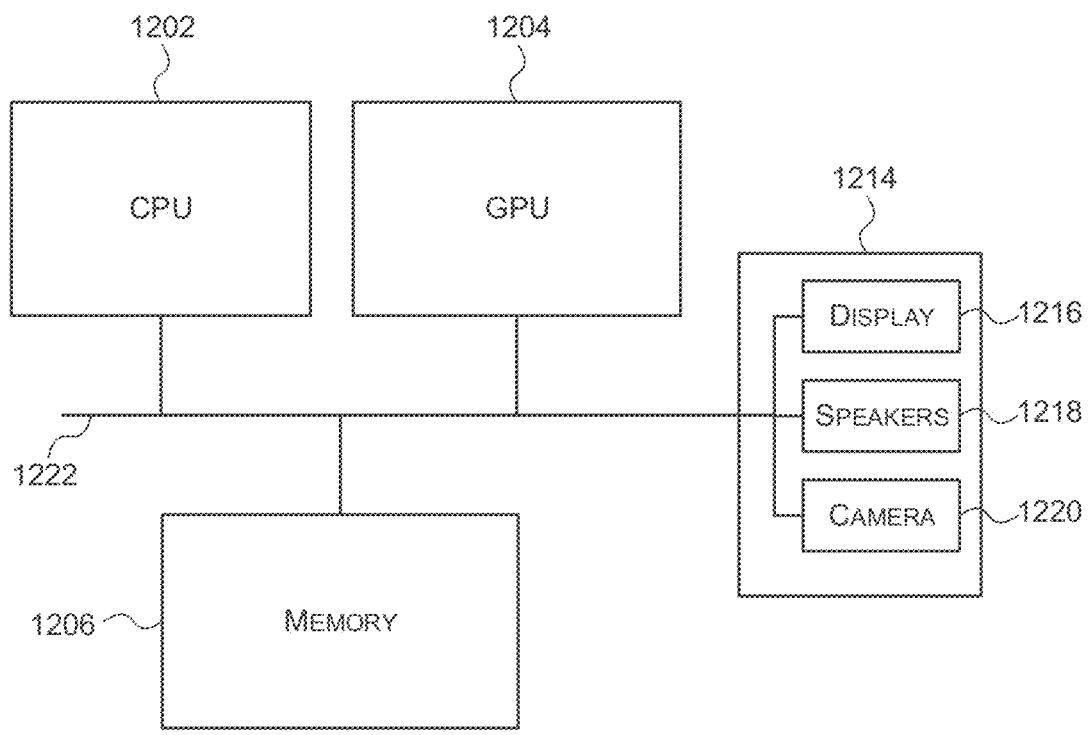
FIG. 12 shows a computer system in which a hardware tessellator or other hardware configured to perform any of the methods described herein, such as a separate Single Primitives Tessellator is implemented.

FIG. 12 shows a computer system in which the GPU pipeline 101 (including the hardware tessellator 111) described above may be implemented. The computer system comprises a CPU 1202, a GPU 1204, a memory 1206 and other devices 1214, such as a display 1216, speakers 1218 and a camera 1220. The improved GPU pipeline 101 shown in FIG. 1B forms part of the GPU 1204. The components of the computer system can communicate with each other via a communications bus 1222.

The hardware tessellator 111 (or other hardware configured to perform any of the methods described herein, such as a separate Single Primitives Tessellator 114) may be embodied in hardware on an integrated circuit. The tessellator unit 111 described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a tessellation unit configured to perform any of the methods described herein, or to manufacture a tessellation unit comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a tessellation unit will now be described with respect to FIG. 13.

Figure 13:
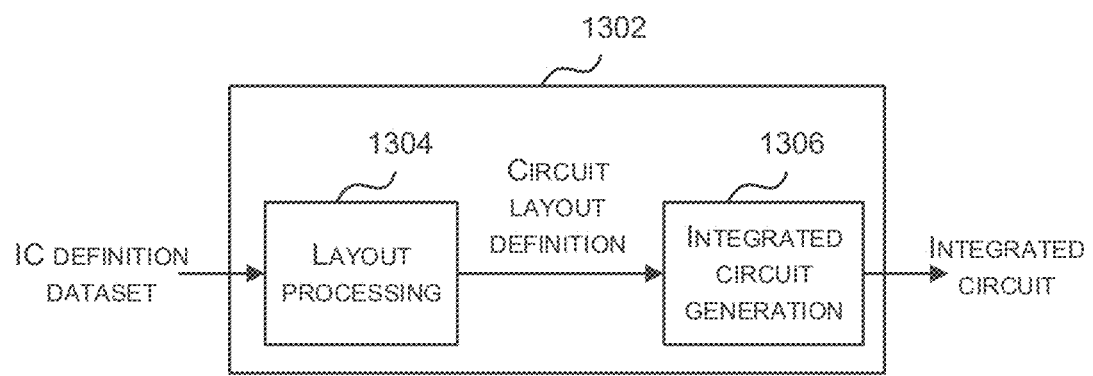
FIG. 13 shows an integrated circuit manufacturing system for generating an integrated circuit embodying a hardware tessellator or other hardware configured to perform any of the methods described herein, such as a separate Single Primitives Tessellator.

FIG. 13 shows an example of an integrated circuit (IC) manufacturing system 1302 which comprises a layout processing system 1304 and an integrated circuit generation system 1306. The IC manufacturing system 1302 is configured to receive an IC definition dataset (e.g. defining a hardware tessellator or other hardware configured to perform any of the methods described herein, such as a separate Single Primitives Tessellator), process the IC definition dataset, and generate an IC according to the IC definition dataset (e.g. which embodies a hardware tessellator or other hardware configured to perform any of the methods described herein, such as a separate Single Primitives Tessellator). The processing of the IC definition dataset configures the IC manufacturing system 1302 to manufacture an integrated circuit embodying a hardware tessellator or other hardware configured to perform any of the methods described herein, such as a separate Single Primitives Tessellator.

The layout processing system 1304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1304 has determined the circuit layout it may output a circuit layout definition to the IC generation system 1306. A circuit layout definition may be, for example, a circuit layout description.

The IC generation system 1306 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1306 may be in the form of computer-readable code which the IC generation system 1306 can use to form a suitable mask for use in generating an IC.

The different processes performed by the IC manufacturing system 1302 may be implemented all in one location, e.g. by one party. Alternatively, the IC manufacturing system 1302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a tessellation unit configured to implement an ordering method as described herein without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 13 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

What is claimed is:

1. A tessellation unit configured to perform tessellation in a computer graphics system, the tessellation unit comprising hardware logic arranged to:
    generate a primitive ID for each primitive obtained by sub-dividing an initial patch, wherein the primitive ID encodes data comprising a sequence of bits,
    wherein each bit in the sequence of bits indicates which branch was taken at a respective one of a plurality of sub-division steps to generate the primitive during tessellation, and wherein each of the plurality of sub-division steps corresponds to a respective, single bit in the sequence of bits.

2. The tessellation unit according to claim 1,
    wherein the hardware logic is further arranged to sub-divide the initial patch into the plurality of primitives using the plurality of sub-division steps.

3. The tessellation unit according to claim 2,
    wherein the data encoded by the primitive ID is about how the primitive was generated by the plurality of sub-division steps, and
    wherein the sequence of bits describes the plurality of sub-division steps taken to generate the primitive during tessellation.

4. The tessellation unit according to claim 1, wherein the sequence of bits that specifies a recursive sequence taken during the tessellation process.

5. The tessellation unit according to claim 4, wherein the ID of a patch further comprises a variable length tail portion and wherein the ID of a patch comprises a fixed number of bits.

6. The tessellation unit according to claim 1, wherein the hardware logic arranged to sub-divide an initial patch into a plurality of primitives using a plurality of sub-division steps comprises hardware logic arranged to:
  analyse an initial patch to determine whether to sub-divide the patch;
  in response to determining that the patch is not to be sub-divided, output the patch as a triangle primitive;
  in response to determining that the patch is to be sub-divided, divide the initial patch into two or more sub-patches;
  select each sub-patch formed by sub-division of the initial patch in turn and repeat the operations with the selected sub-patch in place of the initial patch;
  and wherein the hardware logic arranged to generate an ID for each primitive comprises hardware logic arranged:
  in response to dividing the initial patch into two or more sub-patches, to assign the sub-patches an ID that matches an ID of the patch that has been sub-divided; and
  in response to selecting a patch formed by sub-division of the initial patch, to update IDs of each patch formed by sub-division of the initial patch dependent upon the selection.

7. The tessellation unit according to claim 6, wherein the initial patch is formed by sub-division of a triangle, quad or polygonal domain and the ID of a patch further comprises a header portion comprising one or more bits indicating which of a plurality of initial patches formed from the triangle or quad domain the primitive is in.

8. The tessellation unit according to claim 6, wherein the hardware logic arranged to update IDs of each patch formed by sub-division of the initial patch dependent upon the selection comprises hardware logic arranged, for each ID, to:
  add one or more new bits to the sequence of bits that specifies a recursive sequence taken during the tessellation process, a value of the new bits being dependent upon the selection.

9. The tessellation unit according to claim 6, wherein the initial patch is a triangle patch and the hardware logic arranged to select each sub-patch formed by sub-division of the initial patch in turn and repeating the operations with the selected sub-patch in place of the initial patch comprises hardware logic arranged to:
  select each of the sub-patches formed by sub-division of the initial patch in turn based on values of one or more flags and repeat the operations with the selected sub-patch in place of the initial patch;
  and wherein the hardware logic arranged to repeat the operations with the selected sub-patch in place of the initial patch comprises hardware logic arranged to:
  analyse the selected sub-patch to determine whether to further sub-divide the selected sub-patch;
  in response to determining that the selected sub-patch is not to be sub-divided, output the selected sub-patch as a triangle primitive;
  in response to determining that the selected sub-patch is to be further sub-divided, divide the selected sub-patch into two or more sub-patches; and
  select each sub-patch formed by sub-division of the selected sub-patch in turn based on the values of one or more flags and repeat the operations with the selected sub-patch.

10. The tessellation unit according to claim 9, wherein sub-division forms two patches, a left patch and a right patch and the hardware logic arranged to select each of the left and right patches formed by sub-division of the initial patch in turn based on values of one or more flags comprises hardware logic arranged to:
  select each of the left and right patches formed by sub-division of the initial patch in turn based on a value of an ordering flag.

11. The tessellation unit according to claim 10, further comprising hardware logic arranged to:
  invert the value of the ordering flag once for each increase or decrease in a level of sub-division.

12. A tessellation unit configured to perform tessellation in a computer graphics system, the tessellation unit comprising hardware logic arranged to:
  select an initial patch based on an ID of a previously tessellated primitive, and
  at least partially tessellate the initial patch, wherein it is determined whether to perform sub-division and which of any newly formed sub-patches to further sub-divide based on a respective bit in a sequence of one or more bits in the ID of the previously tessellated primitive, wherein each bit in the sequence of bits corresponds to a respective one of the one or more sub-division stages.

13. The tessellation unit according to claim 12, wherein the hardware logic is further arranged to at least partially tessellate the initial patch with one or more sub-division stages, wherein said whether to perform sub-division and which of any newly formed sub-patches to further sub-divide are determined at each stage of sub-division.

14. The tessellation unit according to claim 12, wherein the tessellation unit further comprises hardware logic arranged to:
  select an input patch based on the data from the surface patch associated with the primitive and subdividing the input patch into one or more initial patches.

15. The tessellation unit according to claim 14, wherein the ID of the previously tessellated primitive or of a patch comprises a sequence of bits that specifies a recursive sequence taken during the tessellation process.

16. The tessellation unit according to claim 14, wherein each bit in the sequence of bits indicates whether to process a left sub-patch or a right sub-patch formed by a sub-division operation in the tessellation process.

17. The tessellation unit according to claim 12, wherein at least partially tessellating the initial patch generated from subdivision of an input patch results in re-generating the previously tessellated primitive.

18. The tessellation unit according to claim 12, further comprising hardware logic arranged to:
  output domain vertices for the previously tessellated primitive.

19. A tessellation unit configured to perform tessellation in a computer graphics system, the tessellation unit comprising hardware logic arranged to:
  generate a plurality of primitive IDs, each for a respective one of the plurality of primitives obtained by sub-dividing an initial patch, wherein each of the plurality of primitive IDs comprising a sequence of bits;
  select the initial patch based on said one of the plurality of primitive IDs, and
  at least partially tessellate the initial patch with one or more sub-division stages, wherein it is determined whether to perform sub-division and which of any newly formed sub-patches to further sub-divide based on a respective bit in a sequence of one or more bits in said one of the plurality of primitive IDs, wherein each bit in the sequence of bits corresponds to a respective one of the one or more sub-division stages.

20. The tessellation unit according to claim 19,
wherein the hardware logic is further arranged to sub-divide the initial patch into the plurality of primitives using the plurality of sub-division steps,
wherein the data encoded by the primitive ID is about how the primitive was generated by the plurality of sub-division steps, and
wherein the sequence of bits describes the plurality of sub-division steps taken to generate the primitive during tessellation.

* * * * *